(12) United States Patent
Lee et al.

(10) Patent No.: US 12,605,007 B2
(45) Date of Patent: Apr. 21, 2026

(54) COOKING DEVICE

(71) Applicant: SHINSTARR PRESENTS CORP.,
Seoul (KR)

(72) Inventors: Sangrok Lee, Seoul (KR); Koangkyun La, Seoul (KR)

(73) Assignee: SHINSTARR PRESENTS CORP.,
Seoul (KR)

( * ) Notice: Subject to any disclaimer, the term of this patent is extended or adjusted under 35 U.S.C. 154(b) by 1125 days.

(21) Appl. No.: 17/432,071

(22) PCT Filed: Aug. 2, 2021

(86) PCT No.: PCT/KR2021/010043
§ 371 (c)(1),
(2) Date: Aug. 18, 2021

(87) PCT Pub. No.: WO2022/196871
PCT Pub. Date: Sep. 22, 2022

(65) Prior Publication Data
US 2023/0355025 A1     Nov. 9, 2023

(30) Foreign Application Priority Data
Mar. 16, 2021     (KR) ........................ 10-2021-0033904

(51) Int. Cl.
*A47J 27/00*          (2006.01)
*A47J 36/32*          (2006.01)
(Continued)

(52) U.S. Cl.
CPC ............. *A47J 27/004* (2013.01); *A47J 36/32* (2013.01); *A47J 43/046* (2013.01); *A47J 43/085* (2013.01); *A47J 47/01* (2013.01)

(58) Field of Classification Search
CPC ........ A47J 27/004; A47J 36/32; A47J 43/046; A47J 43/085; A47J 47/01; A47J 27/086; A47J 27/002; A47J 43/0716
(Continued)

(56) References Cited

U.S. PATENT DOCUMENTS

2006/0112838 A1     6/2006  Herbst ............................ 99/422
2016/0106259 A1     4/2016  Xu et al.
(Continued)

FOREIGN PATENT DOCUMENTS

CN        107647767 A  *  2/2018  ............. A47J 27/00
CN        111481043 A  *  8/2020
(Continued)

OTHER PUBLICATIONS

International Search Report mailed Nov. 24, 2021, issued to the corresponding International Application No. PCT/KR2021/010043.
(Continued)

*Primary Examiner* — Justin C Dodson
(74) *Attorney, Agent, or Firm* — Stein IP, LLC

(57)          ABSTRACT
Proposed is a cooking apparatus. The cooking apparatus of the present disclosure includes: an inner portion in which a food is contained and heated; an outer portion installed in a shape that surrounds an outside of the inner portion; a heating portion configured to heat the inner portion by using electrical energy; a housing portion installed in a shape that surrounds both the heating portion and the outer portion; a first driving portion positioned between the outer portion and the housing portion, and configured to rotate the inner portion in a first direction; and a second driving portion positioned outside the housing portion and configured to rotate the housing portion in a second direction, wherein the second driving portion includes: a second motor member; a power transmitting portion; an inner support portion; and an
(Continued)

elevating portion, wherein the cooking apparatus further includes an integrated distributing portion.

11 Claims, 21 Drawing Sheets

(51) Int. Cl.
  *A47J 43/00* (2006.01)
  *A47J 43/046* (2006.01)
  *A47J 43/08* (2006.01)
  *A47J 47/01* (2006.01)
(58) Field of Classification Search
  USPC ............................ 99/334, 348, 451; 219/624
  See application file for complete search history.

(56) References Cited

U.S. PATENT DOCUMENTS

| | | | | |
|---|---|---|---|---|
| 2019/0365134 | A1* | 12/2019 | Ma | A47J 27/004 |
| 2020/0069109 | A1* | 3/2020 | Kuo | A47J 27/14 |
| 2020/0375392 | A1* | 12/2020 | Pan | A47J 37/047 |

FOREIGN PATENT DOCUMENTS

| | | | | | |
|---|---|---|---|---|---|
| CN | 111796526 | A | * | 10/2020 | |
| CN | 112178714 | A | * | 1/2021 | ............. A47B 77/08 |
| JP | 2004-243014 | A | | 9/2004 | |
| JP | 2006-61183 | A | | 3/2006 | |
| JP | 2008-526400 | A | | 7/2008 | |
| JP | 2018-518348 | A | | 7/2018 | |
| KR | 10-1674670 | B1 | | 11/2016 | |
| KR | 10-2019-0130084 | A | | 11/2019 | |
| KR | 10-2020-0075821 | A | | 6/2020 | |
| KR | 10-2258933 | B1 | | 6/2021 | |

OTHER PUBLICATIONS

PCT Written Opinion of ISA mailed Nov. 24, 2021, issued to the corresponding International Application No. PCT/KR2021/010043.

* cited by examiner (a)          (b)

(c)          (d)

(e)

157

158

COOKING DEVICE

CROSS-REFERENCE TO RELATED APPLICATIONS

This application is a national stage of International Application No. PCT/KR2021/010043 filed Aug. 2, 2021, which claims the benefit of Korean Application No. 10-2021-0033904 filed Mar. 16, 2021, in the Korean Intellectual Property Office, the disclosures of which are incorporated herein by reference.

TECHNICAL FIELD

The present disclosure relates to a cooking apparatus. More particularly, the present disclosure relates to a cooking apparatus that is configured to heat and stir-fry food.

BACKGROUND ART

In general, stir-fried food, such as stir-fried spicy pork, stir-fried webfoot octopus, stir-fried rice, etc., is prepared in a stir-frying manner where various ingredients are mixed together and are placed in a cooking container such as a frying pan, a pot, or the like, and then appropriately stir-fried while heating and stirring for a predetermined time.

In particular, in order to prepare stir-fried food using meat, such as beef, pork, poultry, etc., and various by-products, and also various seafoods such as webfoot octopus, long arm octopus, squid, etc., to be tasty, uniform heat should be evenly applied to food ingredients. For achieving this, a chef should continuously perform mixing of the ingredients for stir-fried food in front of a cooking table.

For example, when a chef grabs a handle of a pan and pulls with a small radius snap, then pushes and raises the pan, food ingredients accommodated at a bottom surface of the pan will rise quicky around an inner circumference of the pan and then flip over again to the bottom surface of the pan. In a similar manner, when the chef grabs the handle of the pan and pushes with a small radius snap, then pulls and raises the pan, the food ingredients accommodated at the bottom surface of the pan will rise quickly around the inner circumference of the pan and then flip over again to the bottom surface of the pan. By performing these repetitive movements, stir-fry cooking is performed.

However, in order for the chef to flip the food ingredients by using the pan, a snap of a wrist has to be performed, and there is a problem in that strain on a wrist joint or an arm joint occurs due to repeating of the repetitive snap movement.

In addition, since one chef may only prepare one food at once, it is difficult to prepare a large amount of food or different types of stir-fried foods at the same time. Therefore, there is a need for solving these problems.

The related art of the present disclosure is disclosed in Korean Patent Application Publication No. 10-2019-0130084 (published on Nov. 21, 2019 and entitled: Apparatus for roast cook).

DISCLOSURE

Technical Problem

An objective of the present disclosure is to provide a cooking apparatus capable of automatically cooking a stir-fried food.

In addition, another objective of the present disclosure is to provide a cooking apparatus capable of mixing and stir-frying a food in various manners, and is also to provide a function that a food ingredient is automatically provided to the cooking apparatus.

The objectives of the present disclosure are not limited to the objectives mentioned above, and other objectives and advantages of the present disclosure can be understood from the descriptions below and can be more clearly understood from the embodiments of the present disclosure. In addition, it should be easily appreciated that the objectives and advantages of the present disclosure may be achieved from the elements disclosed in the claims and combinations thereof.

Technical Solution

A cooking apparatus according to the present disclosure may include: an inner portion in which a food is contained and heated; an outer portion installed in a shape that surrounds an outside of the inner portion; a heating portion configured to heat the inner portion by using electrical energy; a housing portion installed in a shape that surrounds both the heating portion and the outer portion; a first driving portion positioned between the outer portion and the housing portion, and configured to rotate the inner portion in a first direction; and a second driving portion positioned outside the housing portion and configured to rotate the housing portion in a second direction, wherein the second driving portion may include: a second motor member installed in a position spaced apart from the housing portion, and configured to convert electrical energy to rotational power; a power transmitting portion connecting a second output shaft to the housing portion; an inner support portion configured to support the second motor member; and an elevating portion configured to raise and lower the inner support portion, wherein the housing portion that receives the rotational power of the second motor member is rotated in the second direction, wherein the cooking apparatus may further include an integrated distributing portion configured of a plurality of food ingredient distributing portions in which food ingredients are respectively contained, and while one of the food ingredient distributing portions is selected among the plurality of the food ingredient distributing portions and the food ingredient contained in the selected food ingredient distributing portion is supplied, the food ingredient distributing portion is selected by rectilinearly moving the food ingredient distributing portion.

In addition, the cooking apparatus may further include: a central processing unit configured to control a driving of the cooking apparatus and to control a movement of the food ingredient distributing portions and to control an adding of the food ingredient, wherein, when cooking of the food begins, the central processing unit performs an algorithm of adding the food ingredient from the food ingredient distributing portion.

In addition, the cooking apparatus may further include: a memory portion in which an algorithm and data are stored, wherein the integrated distributing portion is provided with the plurality of the food ingredient distributing portions, a distance between each of the food ingredient distributing portions in the integrated distributing portion is predetermined, an order of the food ingredient distributing portions that is an order of adding the food ingredient is predetermined, the predetermined order and the distance of moving are stored in the memory portion as the data and the algorithm, and the central processing unit automatically adds the food ingredients by the data and the algorithm that are stored in the memory portion.

In addition, the food ingredient discharging port may further include a valve, respectively, and the food ingredient is added by opening and closing the valve, and the plurality of the food ingredient distributing portions is provided to be arranged in a plurality of columns, and is provided with a food ingredient discharging port, respectively.

In addition, each size of all of the food ingredient distributing portions existing in the integrated distributing portion may be identical to each other, or may be different from each other.

Advantageous Effects

According to the cooking apparatus of the present disclosure, a rotation and an inclination angle of the inner portion of the apparatus are capable of being adjusted by using the first driving portion and the second driving portion, and time and cost for preparing a food may be reduced since the food is automatically heated by the heating portion and the direct-firing portion.

In addition, the food is easily mixed by the first stirring portion and the second stirring portion, and various tastes of the food may be prepared since the food is mixed and stir-fried in various manners.

In addition, the food ingredient is automatically added when before at the beginning of the stir-fry cooking, in the middle of cooking, or at the completion of cooking.

In addition, since cleaning of the inner portion is automatically performed by the injecting portion, time and cost required to clean the inner portion may be reduced.

In addition to the effects as described above, specific effects in accordance with the present disclosure will be described together with the detailed description for carrying out the present disclosure.

DESCRIPTION OF REFERENCE NUMERALS

Figure 1:
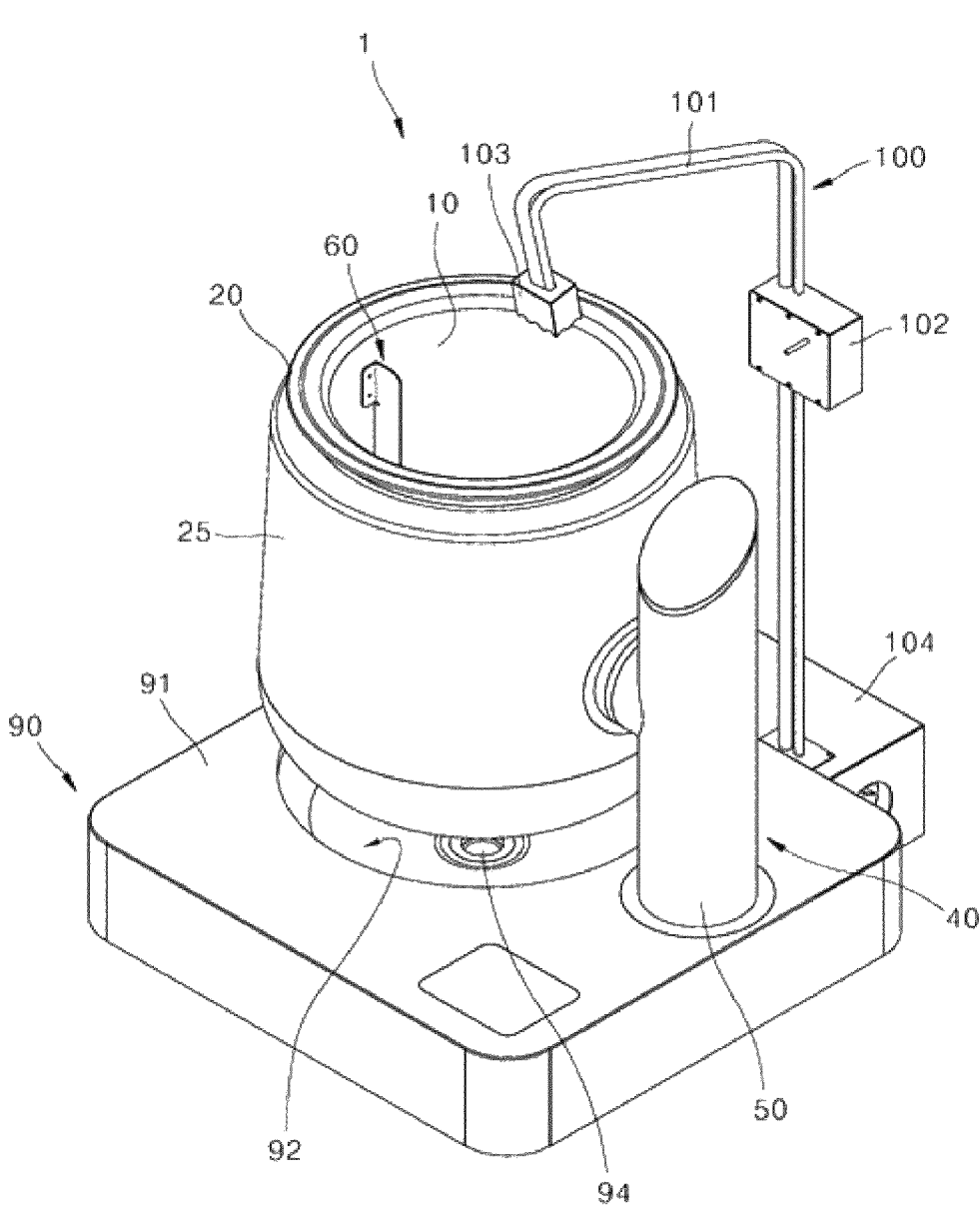
FIG. 1 is a perspective view schematically illustrating a configuration of a cooking apparatus according to an embodiment of the present disclosure.

1: Cooking apparatus
10, 200: Inner portion 11: Base member
20: Outer portion 25: Housing portion
26: Housing body 27: Housing cover
28: Fixed support portion 30: First driving portion
31: First motor member 32: First output shaft
40: Second driving portion 41: Second motor member
42: Second output shaft 43: Power transmitting portion
44: Target measurement member 45: Sensor member
46: Inner support portion 47: Elevating portion
48: Elevating body 49: Rod member
50: Driving case 60: First stirring portion
61: Fixing bracket 62: Rectilinear portion
63: Curved portion 70: Second stirring portion
71: Core member 72: Fixing member
80: Heating portion 81: Induction wire
90: Receiving portion 91: Body portion
92: Water collecting portion 93: Injecting portion
94: Water draining portion 100: Direct-firing portion
101: Direct-firing pipeline 102: Valve portion
103: Nozzle portion 104: Direct-firing base portion
130: Rectilinear moving portion 140-$n$: Valve driving portion
150: Integrated distributing portion 150-$n$: Food ingredient distributing portion
152: Food ingredient discharging port 156: Valve
157: Moving bar 158: Connecting portion
159: Rotary moving plate 250: Central processing unit
255: Memory portion
D: Longitudinal direction (vertical direction)
A1: First direction L1: First imaginary line
A2: Second direction L2: Second imaginary line

MODE FOR INVENTION

The above-mentioned objectives, features, and advantages will be described in detail with reference to the accompanying drawings, and accordingly, those of ordinary skill in the art to which the present disclosure pertains should be able to easily practice the technical idea of the present disclosure. In describing the present disclosure, when detailed description of known art related to the present disclosure is deemed as having a possibility of unnecessarily obscuring the gist of the present disclosure, the detailed description will be omitted. Hereinafter, exemplary embodiments according to the present disclosure will be described in detail with reference to the accompanying drawings. Like reference numerals in the drawings refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present application, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise.

Hereinafter, a cooking apparatus according to an embodiment of the present disclosure will be explained.

Figure 2:
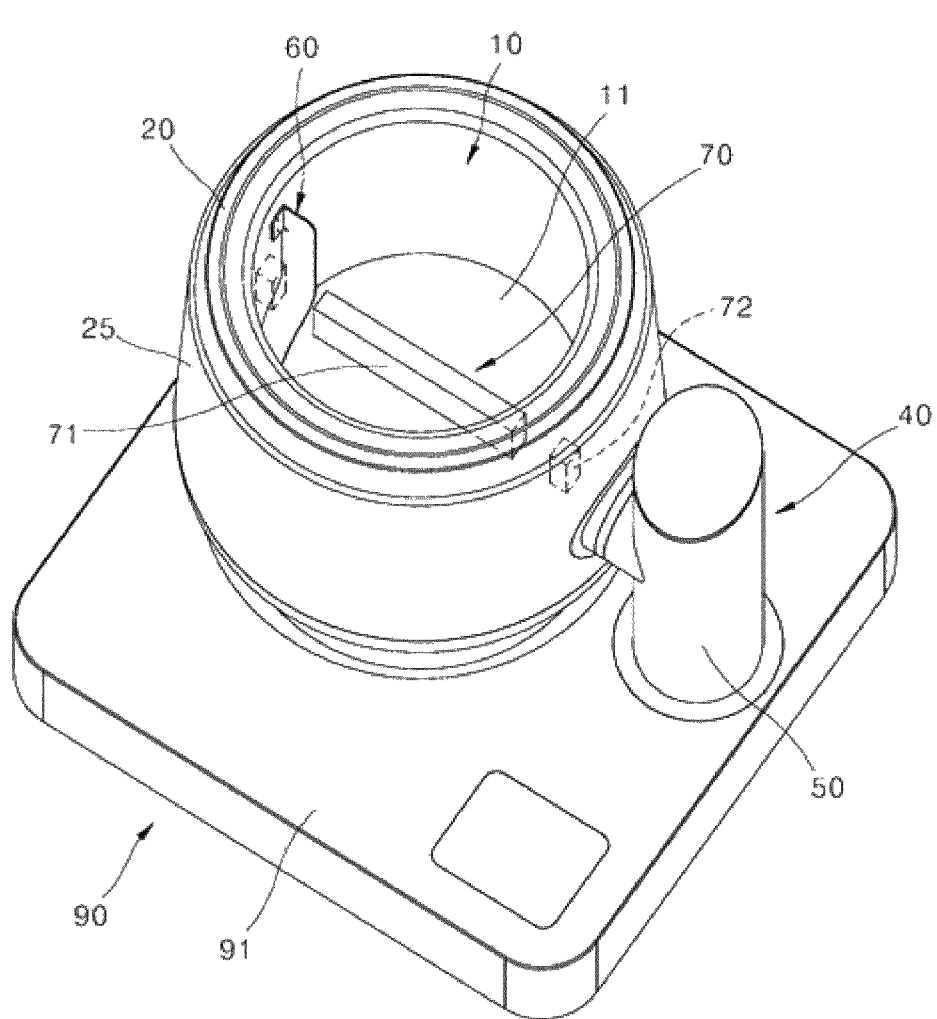
FIG. 2 is a perspective view illustrating a state in which a first stirring portion and a second stirring portion according to an embodiment of the present disclosure are installed.
Figure 3:
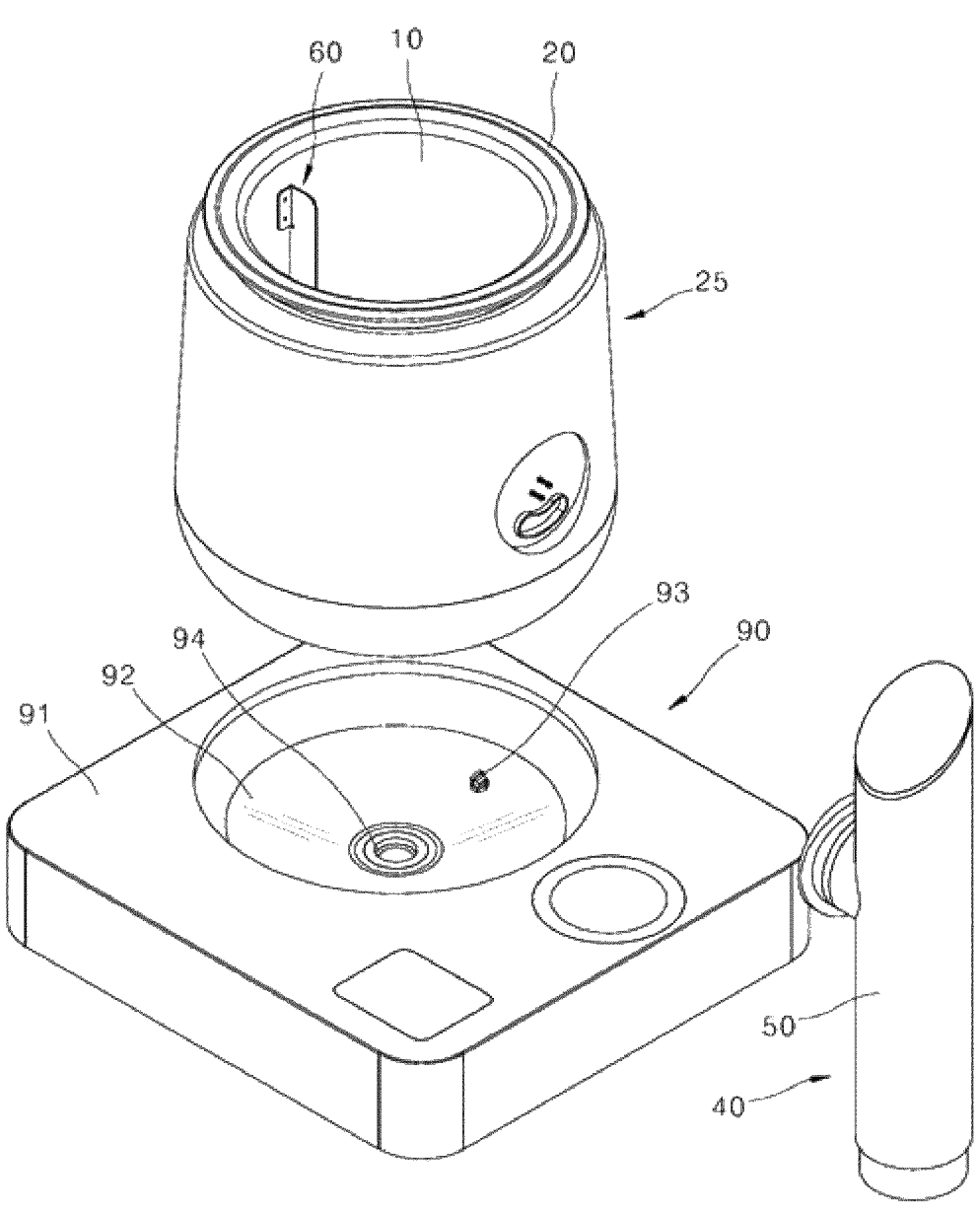
FIG. 3 is an exploded perspective view illustrating the cooking apparatus according to an embodiment of the present disclosure.

FIG. 1 is a perspective view schematically illustrating a configuration of a cooking apparatus 1 according to an embodiment of the present disclosure. FIG. 2 is a perspective view illustrating a state in which a first stirring portion 60 and a second stirring portion 70 according to an embodiment of the present disclosure are installed. FIG. 3 is an exploded perspective view illustrating the cooking apparatus 1 according to an embodiment of the present disclosure.

As illustrated in FIGS. 1 to 4, the cooking apparatus 1 according to an embodiment of the present disclosure includes an inner portion 10, an outer portion 20, a housing portion 25, a first driving portion 30, a second driving portion 40, a first stirring portion 60, a second stirring portion 70, a heating portion 80, a receiving portion 90, and a direct-firing portion 100.

Figure 4:
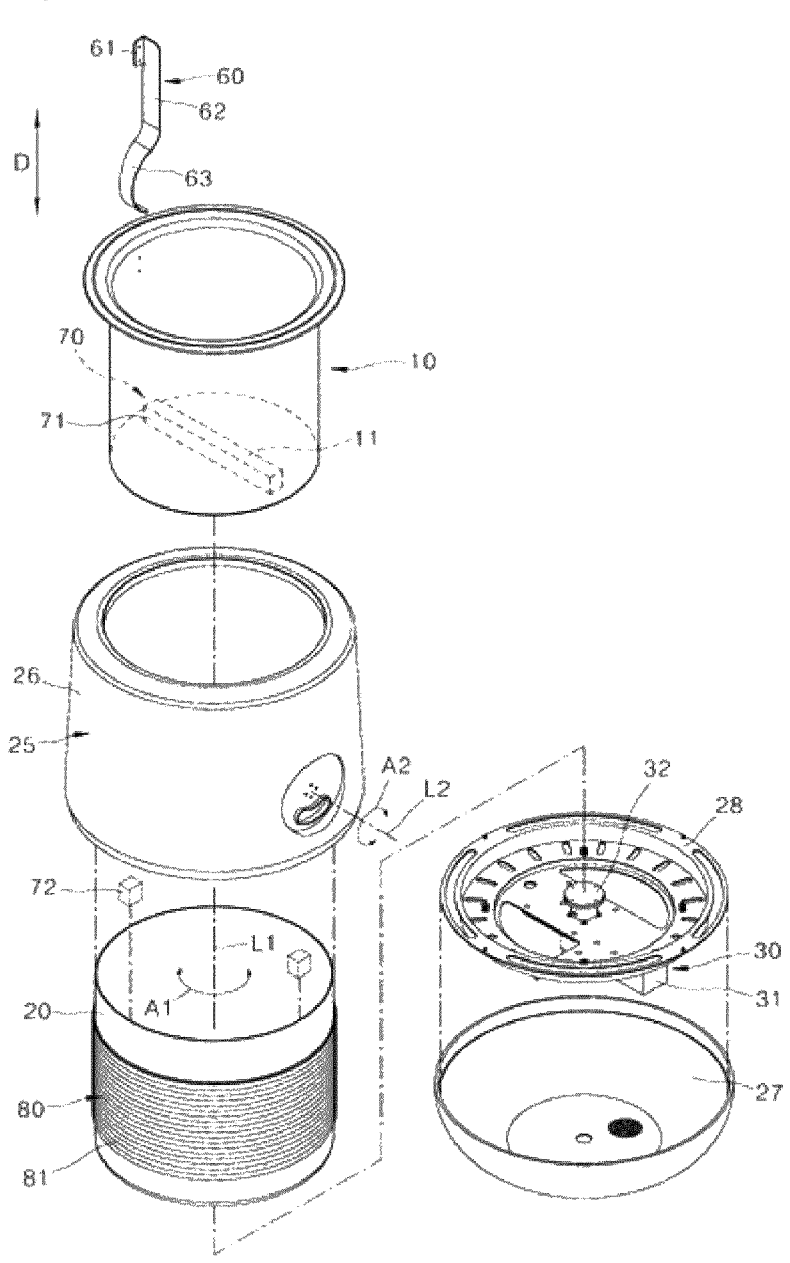
FIG. 4 is a perspective view separately illustrating an inner portion, an outer portion, and a housing portion according to an embodiment of the present disclosure.

FIG. 4 is a perspective view separately illustrating the inner portion 10, the outer portion 20, and the housing portion 25 according to an embodiment of the present disclosure.

As illustrated in FIGS. 1 to 4, a food (now shown) is accommodated inside the inner portion 10, and the inner portion 10 may be variously modified within the technical idea of heating by an external heat source. The inner portion 10 according to an embodiment of the present disclosure has an upper side opened, and the food is accommodated inside the inner portion 10. In addition, a base member 11 formed in a circular plate shape is positioned at a bottom surface of the inner portion 10.

The outer portion 20 is installed in a shape that surrounds an outside of the inner portion 10. In addition, the outer portion 20 is positioned at a lower side of the inner portion 10, and an inner diameter of the outer portion 20 is larger than an outer diameter of the inner portion 10. The outer portion 20 also has a shape wherein an upper side of the outer portion 20 is opened. A stir-frying container according to the present disclosure has a dual structure. A reinforced plastic is used as a material of the outer portion 20, and SUS430 ferromagnetic material may be included in a material of the inner portion 10. Therefore, the inner portion 10 is heated by an induction coil that is installed along a circumference of the outer portion 20.

The housing portion 25 may be variously modified within the technical idea in which the housing portion 25 is installed in a shape that surrounds both the heating portion 80 and the outer portion 20. The housing portion 25 according to an embodiment of the present disclosure includes a housing body 26, a housing cover 27, and a fixed support portion 28. The housing body 26 has a shape that surrounds the outer portion 20, and has a shape wherein an upper side and a lower side of the housing body 26 are opened.

The housing cover 27 is installed in a shape that covers a lower side of the housing body 26. The housing cover 27 is installed in a shape that is concaved downwardly, and is fixed to the lower side of the housing body 26.

The fixed support portion 28 is positioned between the housing portion 25 and the housing cover 27, and the first driving portion 30 is mounted at the fixed support portion 28. The fixed support portion 28, which is positioned at an upper side of the housing cover 27, is fixed to the lower side of the housing body 26.

The first driving portion 30 is positioned between the outer portion 20 and the housing portion 25, and the first driving portion 30 may be variously modified within the technical idea of rotating the inner portion 10 in a first direction A1. The first driving portion 30 according to an embodiment of the present disclosure may include: a first motor member 31 fixed to the housing portion 25 facing the outer portion 20, and configured to convert electrical energy to rotational power; and a first output shaft 32 protruding from the first motor member 31 and fixed to the base member 11 of the inner portion 10.

The first output shaft 32 of the first motor member 31 is connected to a rotation center of the inner portion 10 and is configured to rotate the inner portion 10 in the first direction A1. The first motor member 31 is fixed to a lower side of the fixed support portion 28, and the first output shaft 32 extends to an upper side of the fixed support portion 28 and is fixed to a lower side of the base member 11. Therefore, the inner portion 10 is rotated by a rotation of the first output shaft 32. A connection between the inner portion 10 and the first output shaft 32 may be performed in a fitting manner. As necessary, the connection between the inner portion 10 and the first output shaft 32 may be performed in variously modified manners such as bolting, welding, and so on.

Figure 6:
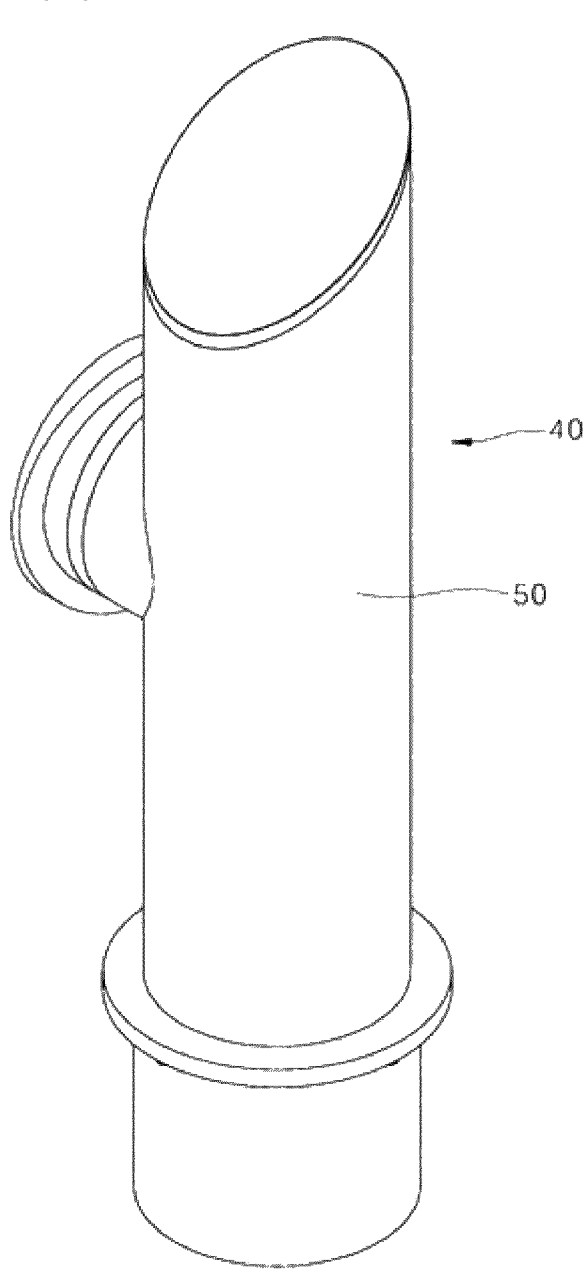
FIG. 6 is a perspective view illustrating an outside of a second driving portion according to an embodiment of the present disclosure.
Figure 7:
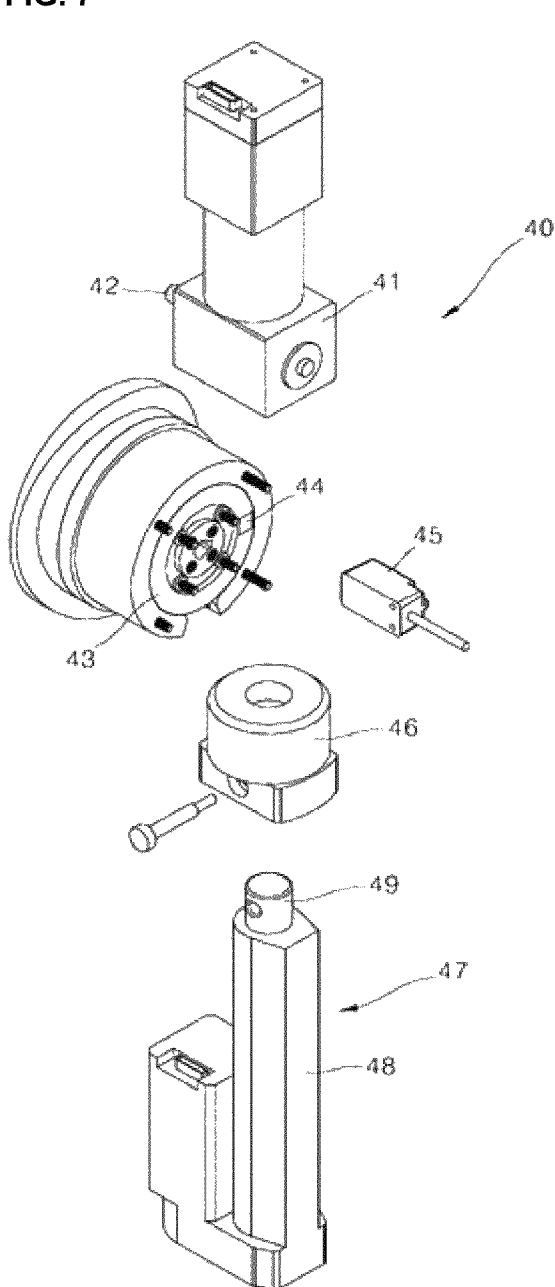
FIG. 7 is an exploded perspective view illustrating the second driving portion according to an embodiment of the present disclosure.
Figure 8:
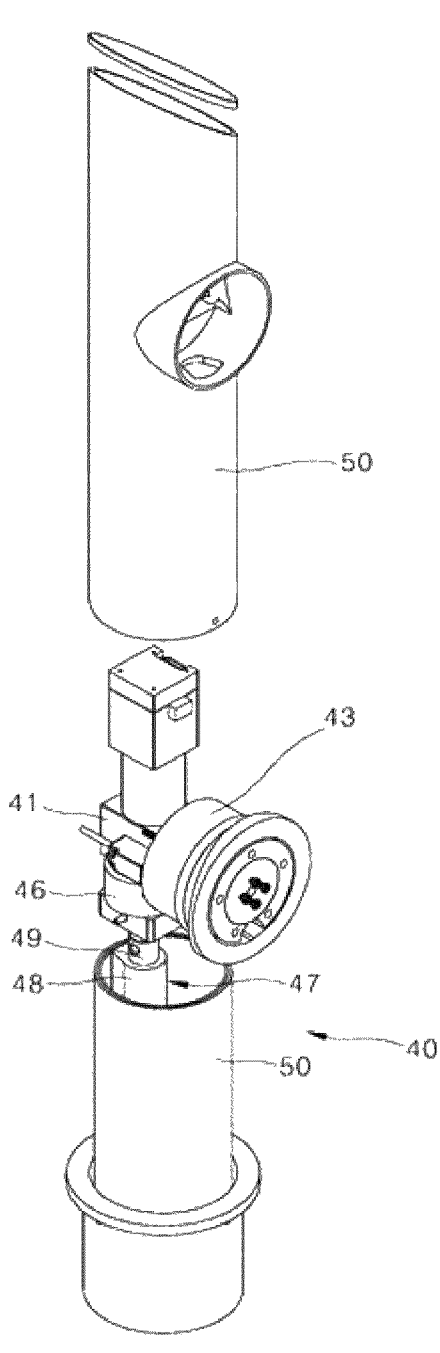
FIG. 8 is a perspective view illustrating a state in which a driving case according to an embodiment of the present disclosure is vertically separated.

FIG. 6 is a perspective view illustrating an outside of the second driving portion 40 according to an embodiment of the present disclosure. FIG. 7 is an exploded perspective view illustrating the second driving portion 40 according to an embodiment of the present disclosure. FIG. 8 is a perspective view illustrating a state in which a driving case 50 according to an embodiment of the present disclosure is vertically separated.

As illustrated in FIGS. 1 to 4, the second driving portion 40 is positioned at an outside of the housing portion 25, and the second driving portion 40 may be variously modified within the technical idea of rotating the housing portion 25 in a second direction A2. As illustrated in FIGS. 6 to 8, the second driving portion 40 according to an embodiment of the present disclosure may include a second motor member 41, a second output shaft 42, a power transmitting portion 43, a target measurement member 44, a sensor member 45, an inner support portion 46, an elevating portion 47, and the driving case 50.

By the second motor member 41 that uses a stepping motor, an inclination of the inner portion 10 is capable of being controlled. When a system of the cooking apparatus 1 is operated, the second driving portion 40 is operated so that the inner portion 10 is positioned to be in a vertical direction. Since the second motor member 41, which is the stepping motor, is operated and adjusts the inclination of the housing portion 25, the inner portion 10 and the outer portion 20 that are positioned inside the housing portion 25 are rotated together with the housing portion 25.

The second motor member 41 is installed at a position spaced apart from the housing portion 25, and various types of motors may be used within the technical idea of converting electrical energy to rotational power. The stepping motor is used as the second motor member 41 according to an embodiment of the present disclosure. Moreover, a servo motor may be used as the second motor member 41.

The power transmitting portion 43 may be variously modified within the technical idea of connecting the second output shaft 42 of the second motor member 41 to the housing portion 25. The power transmitting portion 43 according to an embodiment of the present disclosure extends in a horizontal direction, and has a first side fixed to the outside of the housing portion 25 and has a second side connected to the second output shaft 42 of the second motor member 41. Therefore, the housing portion 25, which receives power of the second motor member 41, may be rotated in the second direction A2.

The target measurement member 44 is fixed to the power transmitting portion 43, and is a metal piece that is rotated together with the power transmitting portion 43. In addition, the sensor member 45 is installed at a position facing a movement path of the target measurement member 44, and is configured to detect a movement of the target measurement member 44 in a non-contact manner.

The inner portion 10, which corresponds to the stir-fry container, rotates together with the housing portion 25, and the housing portion 25 rotates together with the power transmitting portion 43. In addition, the target measurement member 44 installed at the power transmitting portion 43 also rotates together with the power transmitting portion 43 so that the inner portion 10 and the target measurement member 44 rotate together. The inner portion 10 is installed in the vertical direction that is an initialization position, and the target measurement member 44 is positioned facing the sensor member 45 when an entrance of the inner portion 10 is installed in an upward direction. Therefore, the sensor member 45 detects the movement of the target measurement member 44 and allows the inner portion 10 to be in a stopped state.

The inner support portion 46 supports the second motor member 41, and may be moved in the vertical direction together with the second motor member 41. The inner support portion 46 is positioned at a lower portion of the second motor member 41, and the second motor member 41 is fixed to an upper side of the inner support portion 46.

The elevating portion 47 may be variously modified within the technical idea of raising and lowering the inner support portion 46. The elevating portion 47 according to an embodiment of the present disclosure may include: an elevating body 48 positioned at a lower side of the inner support portion 46 and configured to generate power; and a rod member 49 protruding to an upper side of the elevating body 48 and connected to the inner support portion 46, and configured to be moved in the vertical direction by a movement of the elevating body 48.

By being supplied with hydraulic pressure or pneumatic pressure, the elevating body 48 may supply the power to move in the vertical direction. Alternatively, a motor is installed inside the elevating body 48, and is capable of moving the rod member 49 in the vertical direction by a plurality of gears that transmits power of the motor.

The rod member 49 has a bar shape that extends in the vertical direction, and the upper side of the rod member 49 is connected to the inner support portion 46.

As illustrated in FIG. 4, the first direction A1 in the present disclosure is a direction in which the inner portion 10 is rotated around a first imaginary line L1 that extends in a longitudinal direction D of the inner portion 10, and a second direction A2 is a direction in which the housing portion 25 is rotated around a second imaginary line L2 that extends to a side surface of the housing portion 25. The inner portion 10 is rotated along the first direction A1, and rotates the food existing inside the inner portion 10. In addition, an inclination angle of the inner portion 10 is adjusted along the second direction A2 so that the food may be stir-fried in various manners. In addition, when the inner portion 10, which is rotated in the second direction A2, is in a state of being upside down, cleaning of the inner portion 10 may be performed or the food may be contained in another container.

The first stirring portion 60 is fixed to the inside of the inner portion 10 and is rotated together with the inner portion 10, and the first stirring portion 60 may be variously modified within the technical idea of stirring the food. The first stirring portion 60 protrudes to the inside of the inner portion 10, and may extend in the longitudinal direction D of the inner portion 10.

The first stirring portion 60 according to an embodiment of the present disclosure includes: a fixing bracket 61 fixed to an inside surface of the inner portion 10; a rectilinear portion 62 that extends from the fixing bracket 61 and extends toward the inside of the inner portion 10; and a curved portion 63 that extends from the rectilinear portion 62 and forms a curved surface. Since the curved portion 63 in contact with the food is concavely formed, the food contained in the inner portion 10 may be easily stirred.

The second stirring portion 70 is installed in a direction intersecting with the first stirring portion 60, and is positioned at the base member 11 of the inner portion 10. In addition, the second stirring portion 70 stirs the food together with the first stirring portion 60, and the second stirring portion 70 may be variously modified within the technical idea of being in a state in which the second stirring portion 70 maintains a fixed state and is not rotated with the outer portion 20. The second stirring portion 70 according to an embodiment of the present disclosure may include: a core member 71 positioned at an upper side of the base member 11 and provided with magnetic poles at both sides thereof; and a fixing member 72 fixed to the inside of the housing portion 25 facing the core member 71 and provided with opposite magnetic poles. In addition, when the inner portion 10 is rotated, a rotation of the core member 71 may be restrained by the fixing member 72.

In addition, when the core member 71, which uses a magnet, is in a state of being in contact with the base member 11 of the inner portion 10, the core member 71 maintains a state in which the rotation of the core member 71 is restrained, and also when the food is discharged, the core member 71 having a bar shape is blocked from moving outside of the inner portion 10. If the core member 71 has a weak fixation power, a separate electromagnet may be additionally installed.

A permanent magnet may be used as the fixing member 72, and an electromagnet may be used as necessary. The core member 71 is attached by magnetic force. The fixing member 72 that is fixed to the inside of the outer portion 20 has the magnetic poles that are opposite to a polarity of the core member 71. Therefore, the core member 71 positioned at the inside of the inner portion 10 is fixed in a predetermined direction by magnetism.

When the inner portion 10 is rotated, the food existing at the inside of the inner portion 10 rotates, and since the core member 71 that is a magnetic bar is fixed, the core member 71 evenly mixes the food.

As the magnet used for the core member 71 and the fixing member 72, a neodymium magnet, a samarium-cobalt magnet, or an alnico magnet may be used. Additionally, a solenoid electromagnet may be used.

In the present disclosure, by using the first stirring portion 60 and the second stirring portion 70, the food may be rapidly and easily mixed. The food is stirred by a double action of the first stirring portion 60 and the second stirring portion 70.

The heating portion 80 may be variously modified within the technical idea of using electrical energy to heat the inner portion 10. The heating portion 80 according to an embodiment of the present disclosure may include an induction wire 81 that is installed in a shape that surrounds the outside of the outer portion 20. When the induction wire 81 is operated, the inner portion 10 is heated by eddy currents generated by magnetic induction so that the food is heated.

Figure 9:
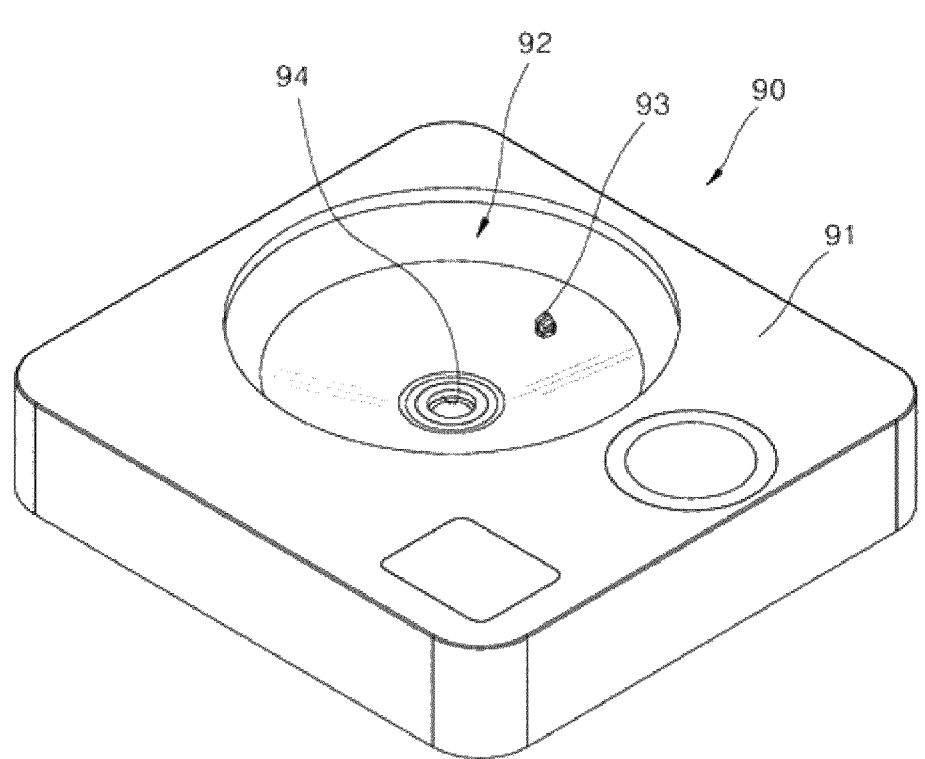
FIG. 9 is a perspective view illustrating a receiving portion according to an embodiment of the present disclosure.

FIG. 9 is a perspective view illustrating the receiving portion 90 according to an embodiment of the present disclosure.

As illustrated in FIG. 9, the receiving portion 90 may be variously modified within the technical idea in which the receiving portion 90 supports the second driving portion 40 and is positioned at the lower side of the housing portion 25. The receiving portion 90 according to an embodiment of the present disclosure may include: a body portion 91 configured to support the second driving portion 40; a water collecting portion 92 formed with a groove portion that has a shape concaved downwardly from an upper portion of the body portion 91 facing the housing portion 25; and an injecting portion 93 installed at the body portion 91 and configured to inject water toward the inner portion 10 or the housing portion 25.

The body portion 91 is positioned at a lower side of the housing portion 25, and is connected to the lower side of the second driving portion 40. The water collecting portion 92 is formed to be concaved toward a center portion thereof, and a water draining portion 94 is installed at the center portion of the water collecting portion 92.

Figure 5:
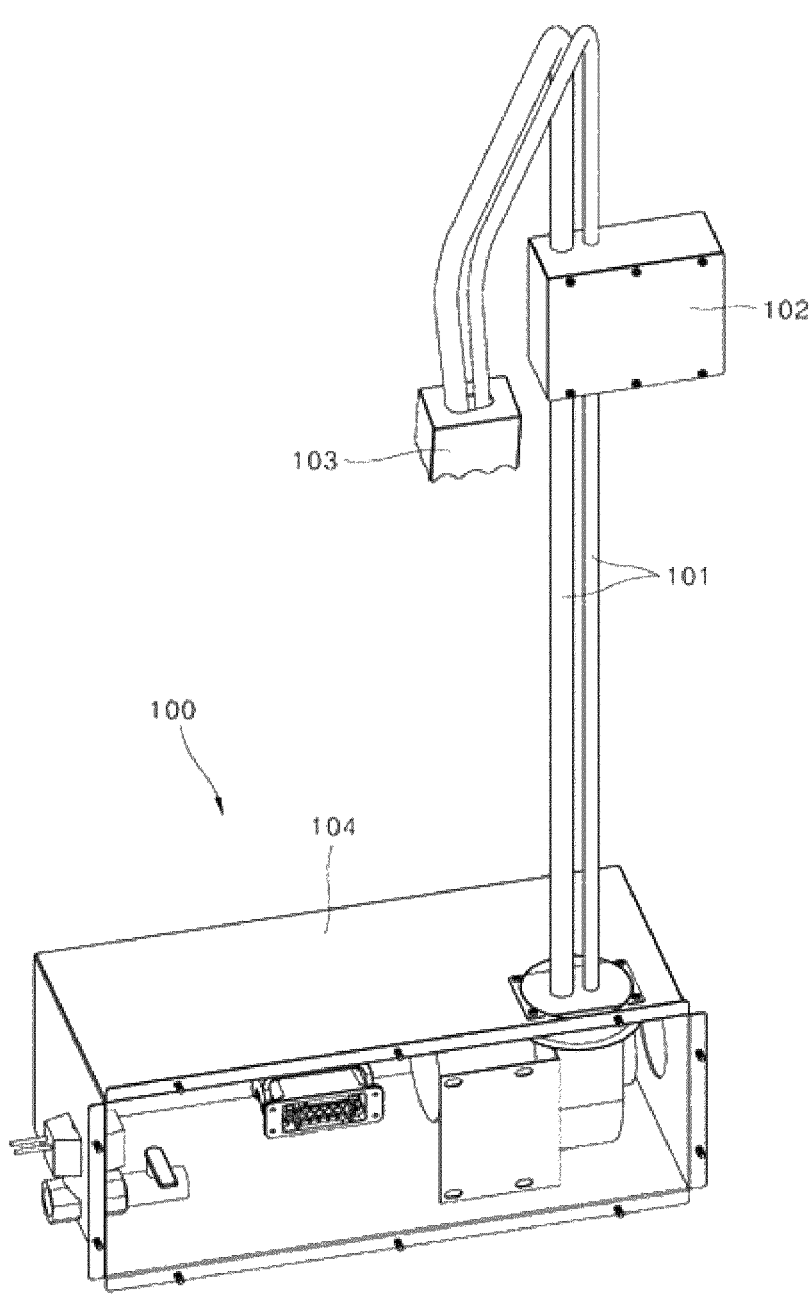
FIG. 5 is a perspective view illustrating a direct-firing portion according to an embodiment of the present disclosure.

FIG. 5 is a perspective view illustrating the direct-firing portion 100 according to an embodiment of the present disclosure.

As illustrated in FIG. 5, the direct-firing portion 100 may be variously modified within the technical idea in which the food existing at the inside of the inner portion 10 is heated by a flame. The direct-firing portion 100 according to an embodiment of the present disclosure may include: a direct-firing pipeline 101 configured to supply fuel gas toward the inner portion 10; and a valve portion 102 connected to the direct-firing pipeline 101 and configured to control a movement of the fuel gas.

In addition, an electrical component related to the direct-firing portion 100 is positioned inside a direct-firing base portion 104, and the fuel gas and the air are moved along the direct-firing pipeline 101 that extends to an upper side of the direct-firing base portion 104. The movement of the fuel gas and the air is controlled by the valve portion 102 that is installed at the direct-firing pipeline 101, and flame is injected through the nozzle portion 103 that is installed at an end portion of the direct-firing pipeline 101.

Hereinafter, an operation state of the cooking apparatus 1 according to an embodiment of the present disclosure will be described in detail with reference to the accompanying drawings.

Figure 10:
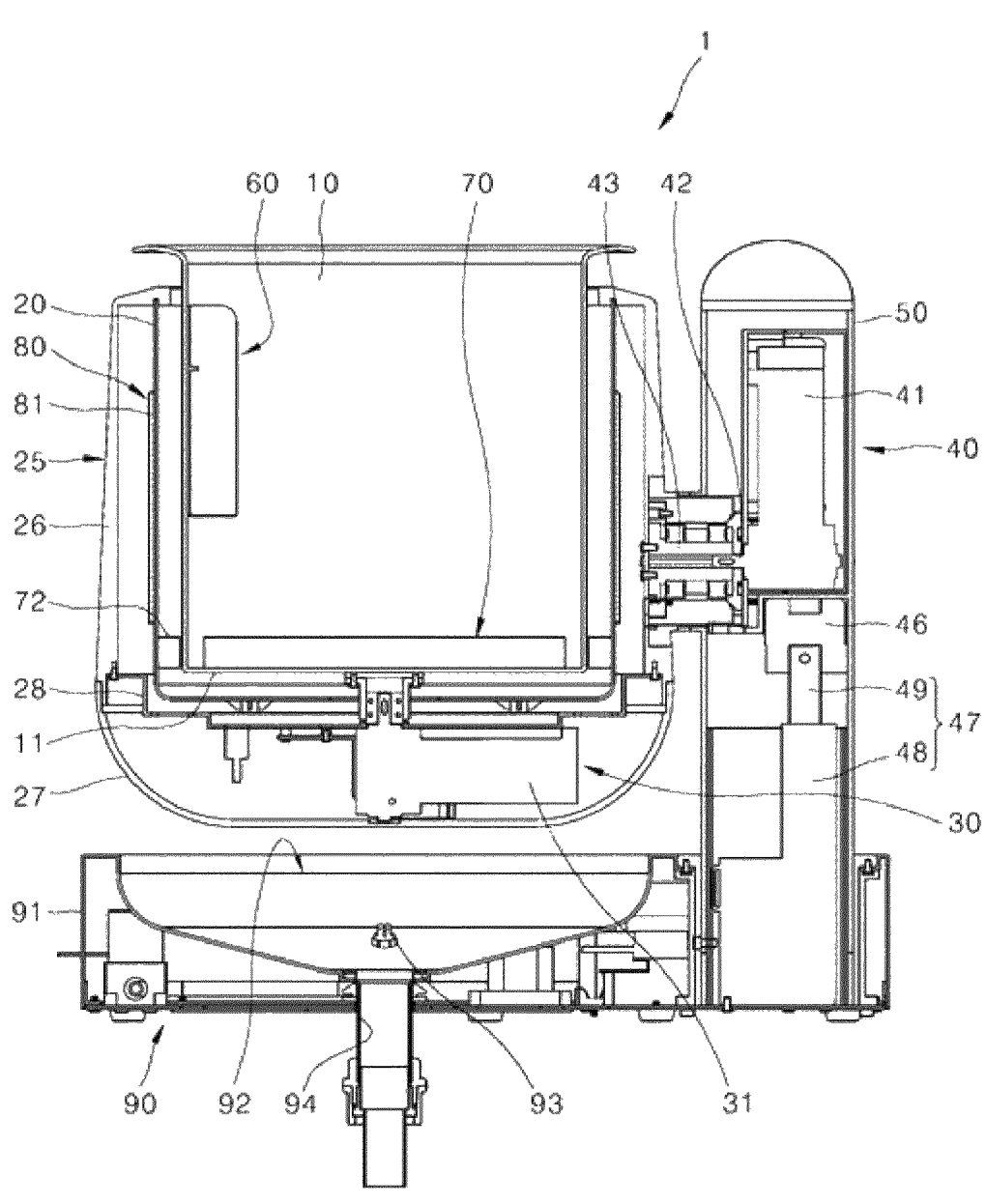
FIG. 10 is a cross-sectional view illustrating the cooking apparatus according to an embodiment of the present disclosure.

FIG. 10 is a cross-sectional view illustrating the cooking apparatus 1 according to an embodiment of the present disclosure. As illustrated in FIG. 1 and FIG. 10, when the food is in a state of being contained in the inner portion 10, the first driving portion 30 is operated and the inner portion 10 is rotated. The first stirring portion 60 is rotated together with the inner portion 10, and the core member 71 of the second stirring portion 70 is in a state of being restrained from rotating so that the stirring of the food is facilitated by the first stirring portion 60 and the second stirring portion 70.

In addition, when a direct-fired cooking is needed, the food existing in the inner portion 10 is heated by flame generated through the nozzle portion 103.

After the food has been cooked, the second motor member 41 is operated and rotates the housing portion 25 so that the food is capable of being moved to another container by changing the inclination angle of the inner portion 10.

Figure 11:
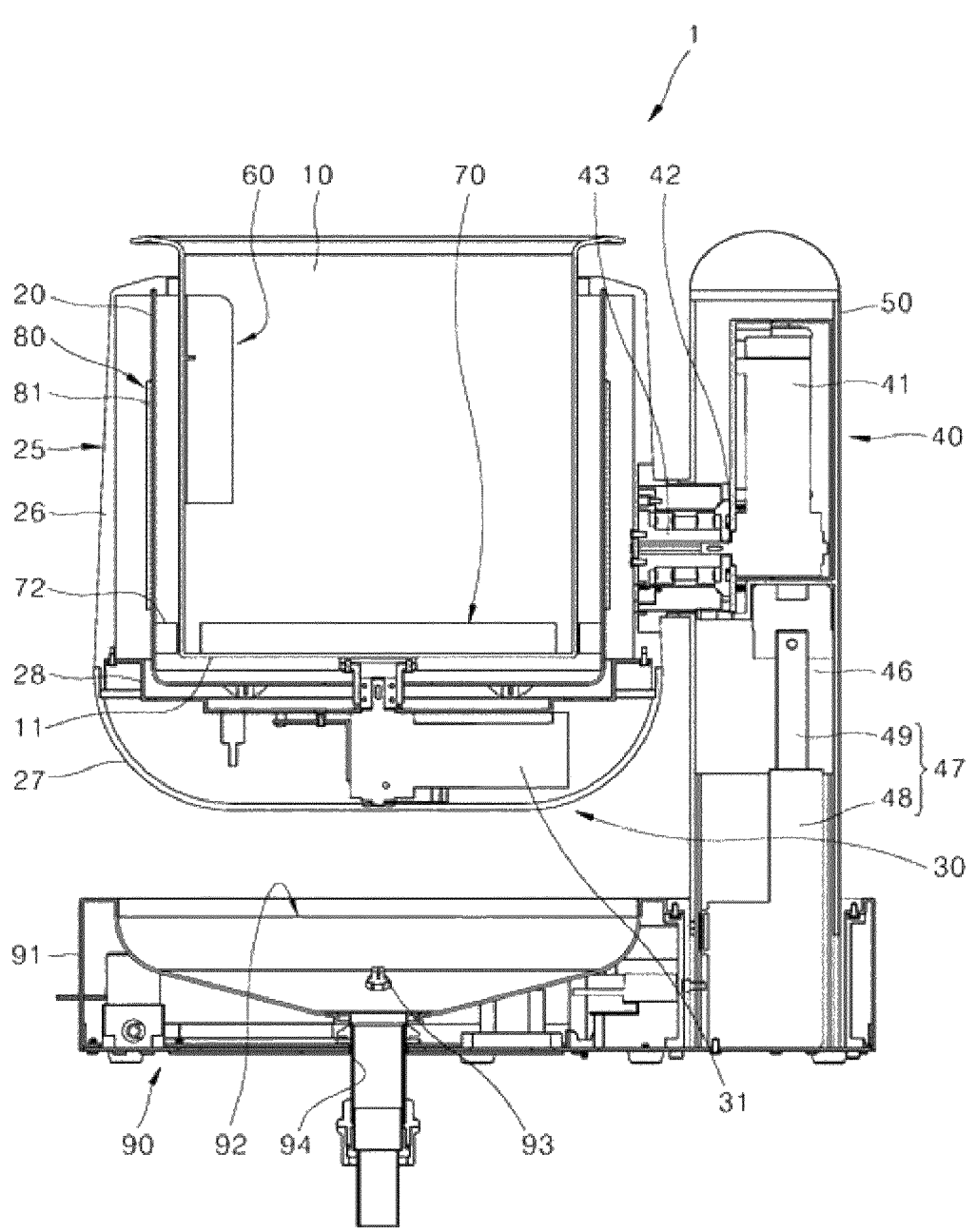
FIG. 11 is a cross-sectional view illustrating a state in which the inner portion is moved upward according to an embodiment of the present disclosure.

FIG. 11 is a cross-sectional view illustrating a state in which the inner portion 10 according to an embodiment of the present disclosure is moved upward.

As illustrated in FIGS. 10 and 11, when the entrance of the inner portion 10 is in a state of facing the upward, the inner support portion 46 moves upward together with the rod member 49 when the elevating portion 47 of the rod member 49 moves upward. Therefore, the power transmitting portion 43 and the housing portion 25 are also moved upward.

Figure 12:
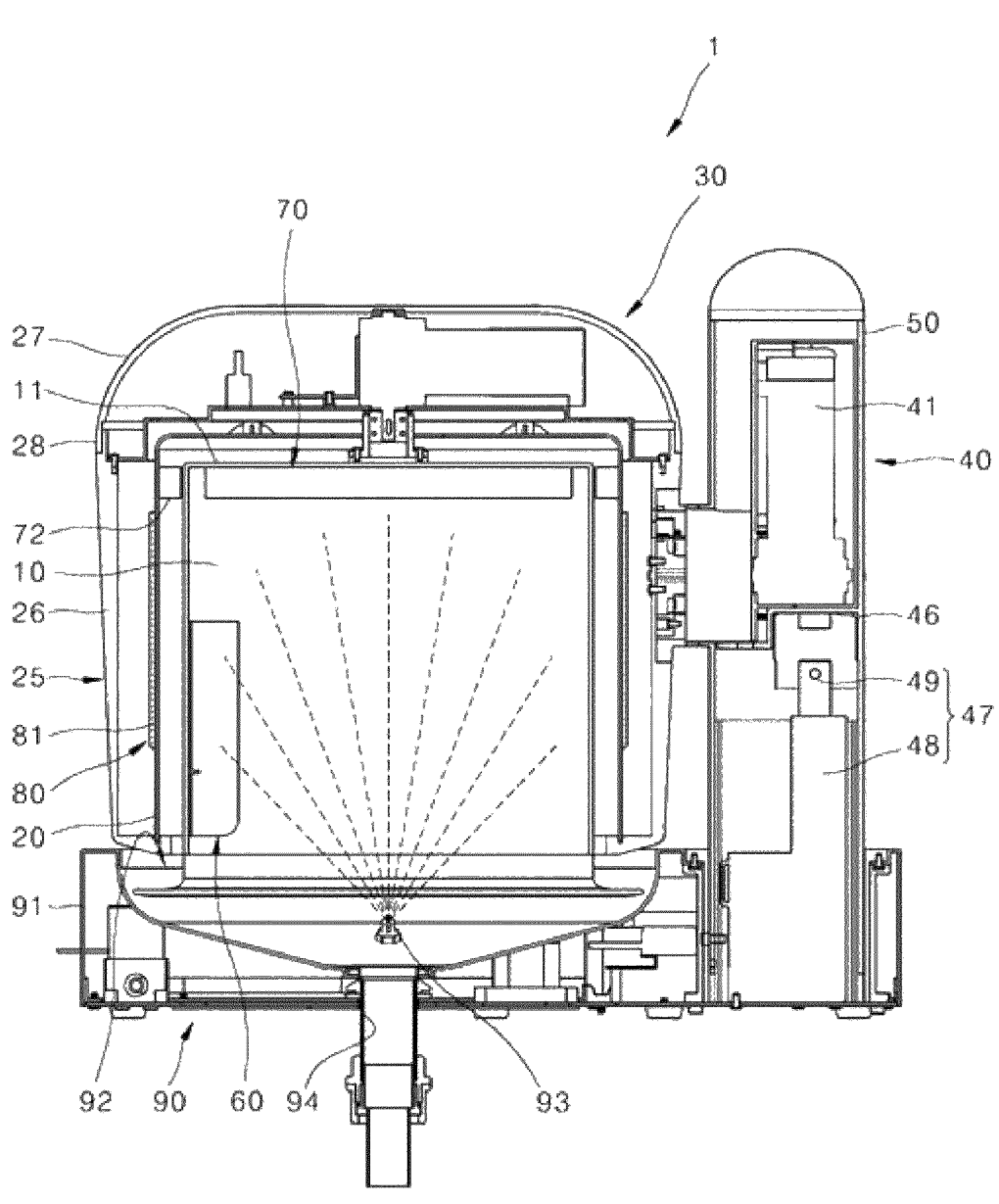
FIG. 12 is a cross-sectional view illustrating a state in which the inner portion is cleaned according to an embodiment of the present disclosure.

FIG. 12 is a cross-sectional view illustrating a state in which the inner portion 10 according to an embodiment of the present disclosure is cleaned.

As illustrated in FIG. 12, when the entrance of the inner portion 10 is in a state of facing downward by the second motor member 41 being operated, since the rod member 49 moves downward by the elevating portion 47 being operated, the inner portion 10 is also moved downward.

In addition, water injected from the injecting portion 93 cleans a remnant that has remained in the inner portion 10, and moves downward. Cleaning water moved along the water collecting portion 92 moves outside the body portion 91 through the water draining portion 94.

A temperature of the inner portion 10 is maintained high, and when pressure of water is injected from the injecting portion 93, contents attached to the inner portion 10 or oil attached to the inner portion 10 may be easily removed.

Hereinafter, another embodiment that the inner portion 200 of the present disclosure is installed in an oval shape will be described with reference to the accompanying drawings.

Figure 13:
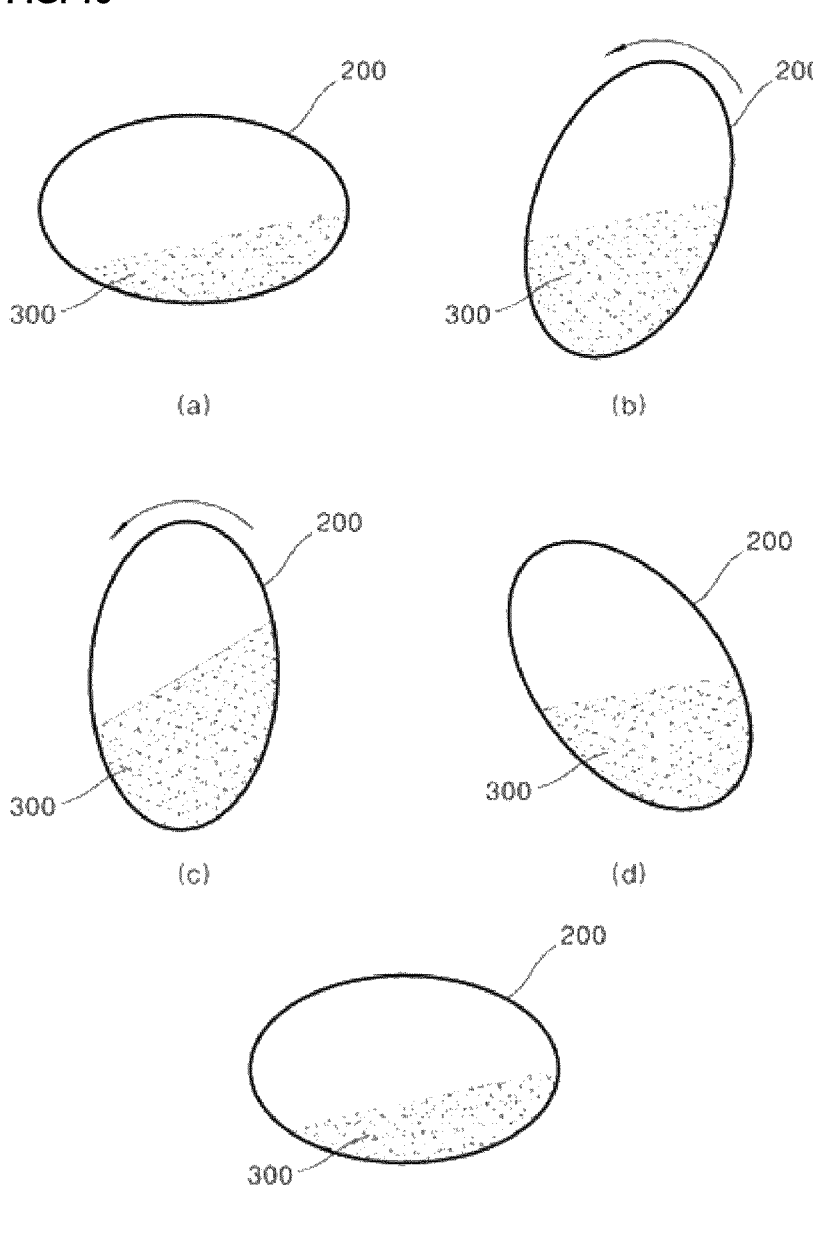
FIG. 13 shows plan views of rotating states of the inner portion formed in an oval shape according to another embodiment of the present disclosure.

FIG. 13 shows plan views of rotating states of the inner portion 200 formed in an oval shape according to another embodiment of the present disclosure.

As illustrated in FIG. 13, the inner portion 200 according to another embodiment of the present disclosure has an oval cross-sectional shape.

When it is assumed that the inner portion 200 is rotated in a counter-clockwise direction, a height of contents positioned at a left side is relatively lower than a height of contents positioned at a right side so that the contents positioned at the right side flow down to the left side and are mixed. In other words, when rotating from a wide area of the floor to a narrow area of the floor, the contents positioned at a higher portion flow down to the left side and are in contact with an inner surface of the inner portion 200. Therefore, as the inner portion 200 is rotated, the food is positioned at the bottom portion of the inner portion 200 so that the mixing of the food may be more easily realized.

When the inner portion 200 has a circular cross-sectional shape, the food positioned at a lower side continuously be in contact with the inner surface of the inner portion 200 so that the mixing does not occur well, and is only mixed by the first stirring portion 60 and the second stirring portion 70.

Therefore, when the inner portion 200 has the oval cross-sectional shape, the mixing of the food may be more easily realized.

Figure 14:
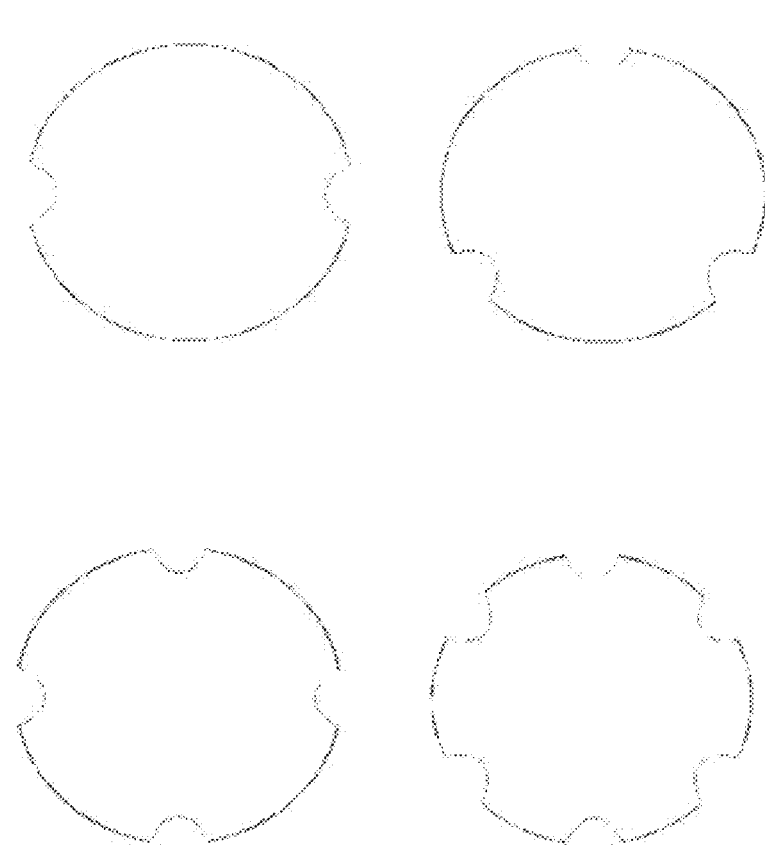
FIG. 14 shows plan views of the inner portion formed with a plurality of protruding portions according to yet another embodiment of the present disclosure.

FIG. 14 shows plan views of the inner portion 200 formed with a plurality of protruding portions according to yet another embodiment of the present disclosure.

As described above, since the rotation and the inclination angle of the inner portion 10 and 200 are capable of being adjusted by using the first driving portion 30 and the second driving portion 40, a time and a cost for preparing the food may be reduced since the food is automatically heated by the heating portion 80 and the direct-firing portion 100. In addition, the food is easily mixed by the first stirring portion 60 and the second stirring portion 70, and the inclination angle of the inner portion 10 and 200 is capable of being adjusted by using the second driving portion 40 so that various tastes of the food may be prepared since the food is mixed and stir-fried in various manners. In addition, since the cleaning of the inner portion 10 and 200 is automatically performed by the injecting portion 93, time and cost required to clean the inner portion 10 and 200 may be reduced.

Figure 15:
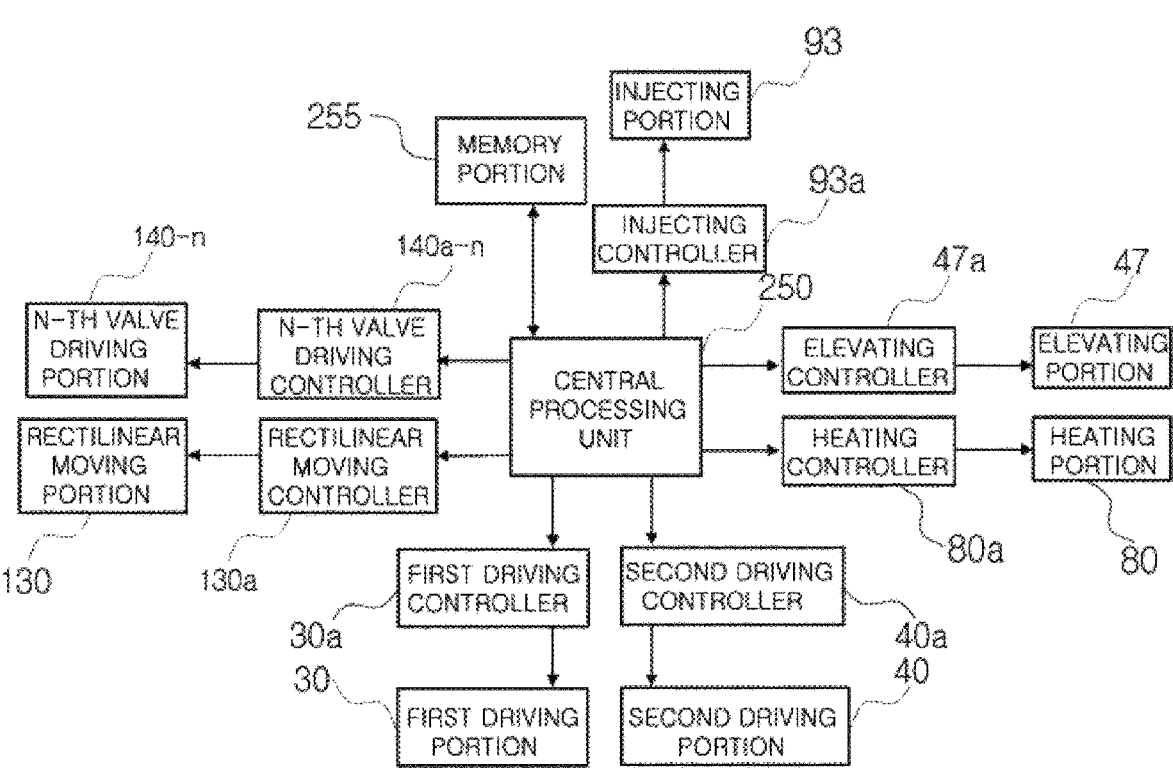
FIG. 15 is a block diagram illustrating a control configuration diagram of the present disclosure.

FIG. 15 is a block diagram illustrating a control configuration diagram of the present disclosure.

FIG. 15 is a block diagram including a configuration for allowing food ingredients to be automatically added. For realizing this configuration, an integrated distributing portion 150 in which the food ingredient that is an ingredient of a stir-fried food is respectively accommodated is provided, and the integrated distributing portion 150 is configured of at least three separate food ingredient distributing portions 150-n. In addition, the food ingredients different from each other are accommodated in the separate food ingredient distributing portions 150, respectively.

In the present disclosure, a central processing unit 250 is configured to control a movement of the first driving portion 30, the second driving portion 40, the elevating portion 47, a rectilinear moving portion 130, and N number of valve driving portions 140-n, and a memory portion is configured to store an algorithm and data.

In addition, a first driving controller 30a configured to control a rotation and a speed of the first motor member 31 exists at the first driving portion 30, and a second driving controller 40a configured to control a rotation, a rotation angle, and a rotation speed of the second motor member 41 exists at the second driving portion 40. In addition, an elevating controller 47a configured to control an elevating power of a hydraulic pressure or a pneumatic pressure exists at the elevating portion 47, and a rectilinear moving controller 130a configured to control a rectilinear movement exists at the rectilinear moving portion 130. In addition, N number of valve driving controllers 140a-n exist at the N number of valve driving portions 140-n that serve to open and close respective valves. The N (natural number) number of valve driving portions 140-n and the N number of valve driving controllers 140a-n are presented.

As described in the previous embodiment of the present disclosure, the first driving portion 30 is configured to rotate the inner portion 10 in the first direction A1 and the second driving portion 40 is configured to rotate the housing portion 25 in the second direction A2. In addition, the elevating portion 47 drives the inner support portion 46 to be vertically moved. In addition, the rectilinear moving portion 130 is configured to allow the food ingredient distributing portions 150-n to be rectilinearly moved in a left and right direction. Further, a motor and a rectilinear gear exist inside the rectilinear moving portion 130 so that the rectilinear movement may be generated, or the rectilinear movement may be generated by using power of a pneumatic pressure or a hydraulic pressure. In addition, the rectilinear moving controller 130a configured to control the rectilinear movement exists at the rectilinear moving portion 130.

In addition, the N number of valve driving portions 140-n configured to open and close the respective valves so as to allow or block discharging of the food ingredient exist, and the N number of valve driving controllers 140a-n exist at the N number of valve driving portions 140-n, respectively. That is, a first food ingredient distributing portion 150-1, a second food ingredient distributing portion 150-2, and an N-th food ingredient distributing portion 150-N exist in the integrated distributing portion 150. Therefore, there are a first valve driving portion 140-1, a second valve driving portion 140-2, and an N-th valve driving portion 140-N exist in the valve driving portions 140-n, and there are a first valve driving controller 140a-1, a second valve driving controller 140a-2, and an N-th valve driving controller 140a-N existing in the valve driving controllers 140a.

By an algorithm stored in the memory portion 255, the central processing unit 250 controls a rotation driving toward the first direction A1, a rotation driving toward the second direction A2, an elevating driving that generates the vertical movement, a driving that generates the rectilinear movement, and driving of opening and closing of the valve.

By a heating controller 80a, the central processing unit 250 controls a temperature of the heating portion 80 that exists in the housing portion 25 so that a temperature of the inner portion 10 is to be 25 degrees Celsius to 250 degrees Celsius. Further, the central processing unit 250 controls a time for maintaining the temperature of the heating portion 80 to be 10 seconds to 900 seconds, and controls the first driving portion 30 by the first driving controller 30a so that a rotation time of the housing portion 25 is controlled to be 10 seconds to 900 seconds.

The central processing unit 250 controls the injecting portion 93 by an injecting controller 93a, and the controlling of the injecting portion 93 by the injecting controller 93a is controlling opening and closing of the valve that functions to discharge or block of water. In addition, by the controlling of the injecting portion 93, an opening time of the valve is controlled to be 10 to 200 seconds.

The central processing unit 250 controls the rotation of the first motor member 31 provided at the first driving portion 30 so that the speed of rotation driving in the first direction is controlled to be 5 rpm to 50 rpm.

—Food Ingredient Discharging Algorithm—

Discharging of the food ingredients is controlled by the central processing unit 250, and a control algorithm is stored in the memory portion 255. In addition, a time when the food ingredient is added is at the beginning of cooking, in the middle of cooking, and at the completion of cooking.

As a stage in which the food ingredient is added at the beginning of stir-fry cooking, an algorithm that begins the stir-fry cooking controlled by the central processing unit 250 is started by an algorithm stored in the memory portion 255.

When the stir-fry cooking is started, the food ingredient that is a raw material of the food is added into the inner portion 10 inside the housing portion 25 by the integrated distributing portion 150. Then, since there may be at least two food ingredients in the food, at least two arbitrary n-th (a number selected from 1 to N) food ingredient distributing portions 150-*n* among the N number of food ingredient distributing portions 150-*n* are selected, and the food ingredients respectively accommodated in the selected food ingredient distributing portions 150-*n* are added into the inner portion 10.

When the n-th food ingredient distributing portion 150-*n* is selected, the central processing unit 250 controls the rectilinear moving controller 130*a* at the rectilinear moving portion 130. For example, in order to a food ingredient accommodated in a third food ingredient distributing portion 150-3 to be added into the inner portion 10, the central processing unit 250 controls the rectilinear moving controller 130*a* by a predetermined algorithm so that the third food ingredient distributing portion 150-3 is to be positioned above the housing portion 25, then the rectilinear moving controller 130*a* controls the rectilinear moving portion 130 so that the integrated distributing portion 150 is rectilinearly moved by a predetermined distance.

A sequence number from first to n-th is respectively determined to the food ingredient distributing portions 150-*n* existing in the integrated distributing portion 150, and the central processing unit 250 selects among the food ingredient distributing portions 150-*n* according to the sequence number.

Consequently, when the central processing unit 250 is programmed to select up to arbitrary k number (natural number) of the food ingredient distributing portions 150-*n* in the integrated distributing portion 150, the central processing unit 250 selects up to the k number of food ingredient distributing portions 150-*n* in the food ingredient distributing portions 150-*n*.

For example, when the central processing unit 250 is programmed to select three as the number of food ingredient distributing portions 150-*n* that are the second food ingredient distributing portion 150-2, the third food ingredient distributing portion 150-3, and the n-th food ingredient distributing portion 150-N, the central processing unit 250 controls the rectilinear movement so that the selected food ingredient distributing portions 150-2, 150-3 and 150-N are to be positioned above the housing portion 25 by the predetermined order, and controls the valve driving controller 140*a*-*n* of the respective food ingredient distributing portions 150-*n* positioned above the housing portion 25. Then, the respective valve portion 140-*n* connected to the selected food ingredient distributing portion 150-*n* opens the valve of the selected food ingredient distributing portion 150-*n* so that the food ingredient is added into the inner portion 10. At this time, a time for opening the valve is predetermined.

As a stage of stir-fry cooking, the stir-fry cooking is performed by the cooking apparatus by a predetermined method.

As a stage in which the food ingredient is added in the middle of the cooking, when the stage of adding the food ingredient in the middle of the cooking begins, the central processing unit 250 controls the second driving controller 40*a* and the second driving controller 40*a* controls the second driving portion 40 so that the opened portion of the housing portion 25 is positioned to be upward.

A method of adding the food ingredient by the integrated distributing portion 150 is the same as a method of adding the food ingredient at the beginning stage of cooking. Since the food ingredient added at the beginning stage of cooking is different from the food ingredient added in the middle stage of cooking, only the food ingredient distributing portion 150-*n* selected by the central processing unit 250 is changed.

As a stage of stir-fry cooking, the stir-fry cooking is performed by the cooking apparatus by a predetermined method.

As a stage in which the food ingredient is additionally added after the stir-fry cooking is completed, a process of adding the food ingredient after finishing the stir-fry cooking may exist (for example, such as a condiment, a decoration ingredient to be sprinkled on the food, and so on), and when the central processing unit 250 determines that the stir-fry cooking is completed, then the central processing unit 250 determines whether the food ingredient is added even after the stir-fry cooking is finished.

By the predetermined algorithm, when the central processing unit 250 determines that the food ingredient does not to be added after finishing the stir-fry cooking, the central processing unit 250 controls the cooking apparatus so that a cleaning process or a process in which the completely cooked food is discharged from the inner portion 10 of the housing portion 25 is performed.

In addition, by the predetermined algorithm, when the central processing unit 250 determines that the adding of food ingredient exists after the finishing of the stir-fry cooking, the central processing unit 250 performs an algorithm of adding the food ingredient after finishing of the stir-fry cooking.

That is, the central processing unit 250 controls the second driving controller and the second driving controller 40*a* controls the second driving portion 40 so that the opened portion of the housing portion 25 is positioned to be upward, then the food ingredient is added by the integrated distributing portion 150. At this time, a method of adding the food ingredient is the same as the method of adding the food ingredient in the previous stage. Of course, since the food ingredients added at the respective stage of cooking are different from each other, only the food ingredient distributing portion 150-*n* selected by the central processing unit 250 is different from the previous process.

When the adding of the food ingredient after finishing of the cooking is finished, the central processing unit 250 performs the cleaning process or the process in which the completely cooked food is discharged from the inner portion 10 of the housing portion 25.

Figure 16:
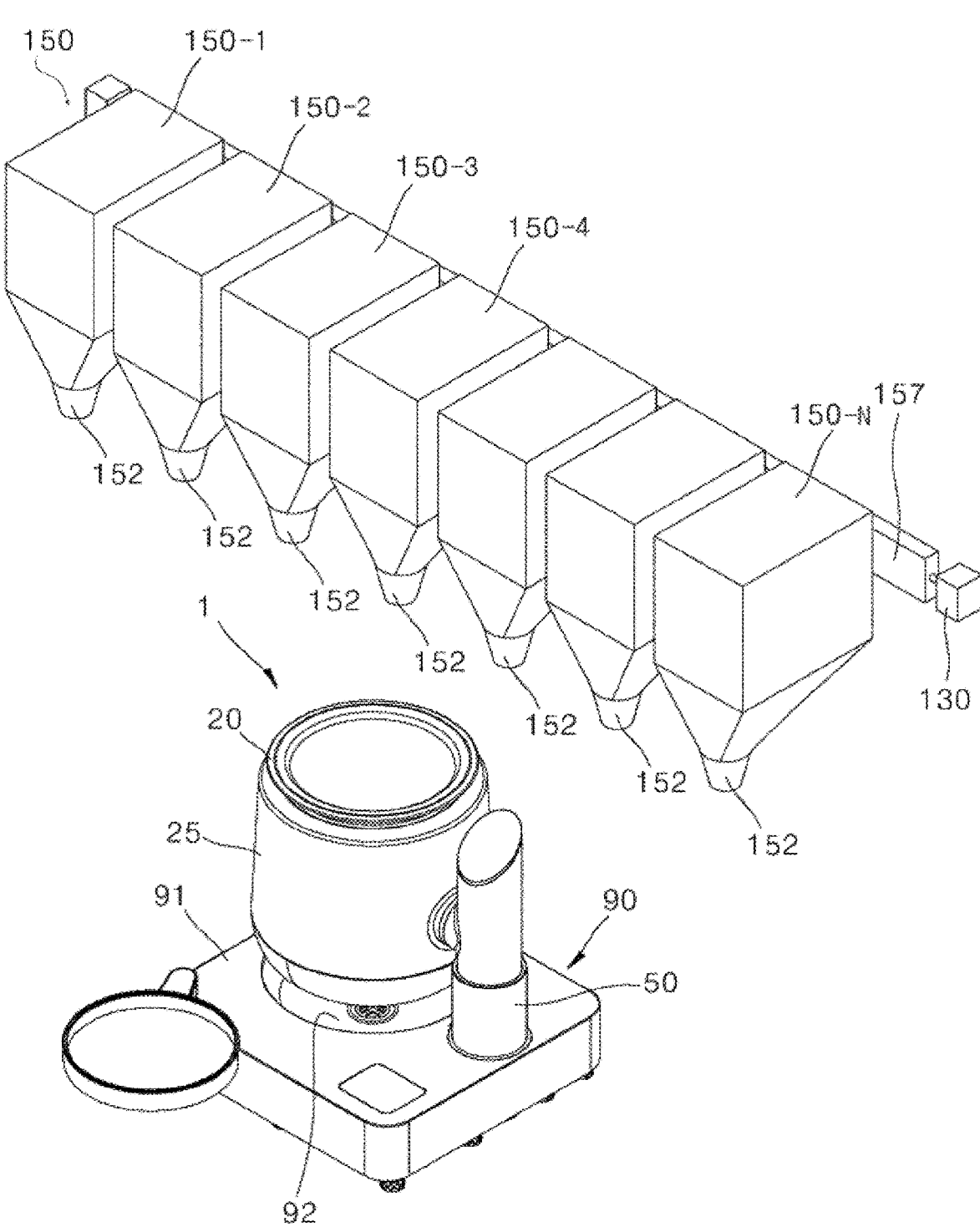
FIGS. 16 to 20 are views illustrating food ingredient distributing portions configured to automatically supply food ingredients by being performed by an algorithm in the block diagram.

FIGS. 16 to 20 are views illustrating the food ingredient distributing portions configured to automatically supply the food ingredients by being performed by an algorithm in of the block diagram. As illustrated in FIG. 16, the N number of food ingredient distributing portions 150-*n* exist in the integrated distributing portion 150, and the N number of food ingredient distributing portions 150-*n* are connected as one by a moving bar 157. In addition, the moving bar 157 is capable of being rectilinearly moved by the rectilinear moving portion 130.

The central processing unit 250 controls the rectilinear moving controller 130*a* and the rectilinear moving controller 130*a* controls the rectilinear moving portion 130 so that such a rectilinear movement of the moving bar 157 occurs. In addition, the rectilinear movement is a rectilinear movement that allows the selected food ingredient distributing portion 150-*n* to be positioned above the housing portion 25. In addition, a food ingredient discharging port 152 is provided at the food ingredient distributing portion 150-*n*, respectively.

The food ingredient distributing portions 150-*n* may have a size identical to each other, or may have different sizes from each other. That is, a size of the first food ingredient distributing portion 150-1 may be different from a size of the second food ingredient distributing portion 150-2. For example, all of the n number of the food ingredient distributing portions 150-*n* may have different sizes from each other, or only some of the food ingredient distributing portions 150-*n* may have sizes identical to each other. Therefore, all of the respective food ingredient discharging ports 152 may also have different sizes from each other, or only some of the food ingredient discharging ports 152 may have sizes identical to each other.

When a distance from the first food ingredient distributing portion 150-1 to the second food ingredient distributing portion 150-2, a distance from the second food ingredient distributing portion 150-2 to the third food ingredient distributing portion 150-3, and a distance from a N–1th food ingredient distributing portion 150-(N–1) to the Nth food ingredient discharging portion 150-N are determined, a rectilinear distance for adding the food ingredient when the food ingredient distributing portion 150-*n* is selected is determined. Further, the rectilinear moving distance is predetermined by data and an algorithm and is stored in the memory portion 255 in advance. Therefore, for example, a process in which the second food ingredient distributing portion 150-2 is selected and the food ingredient in the second food ingredient distributing portion 150-2 is added and then a fifth food ingredient distributing portion 150-5 is selected and the food ingredient in the fifth food ingredient distributing portion 150-5 is added is capable of being performed.

Figure 17:
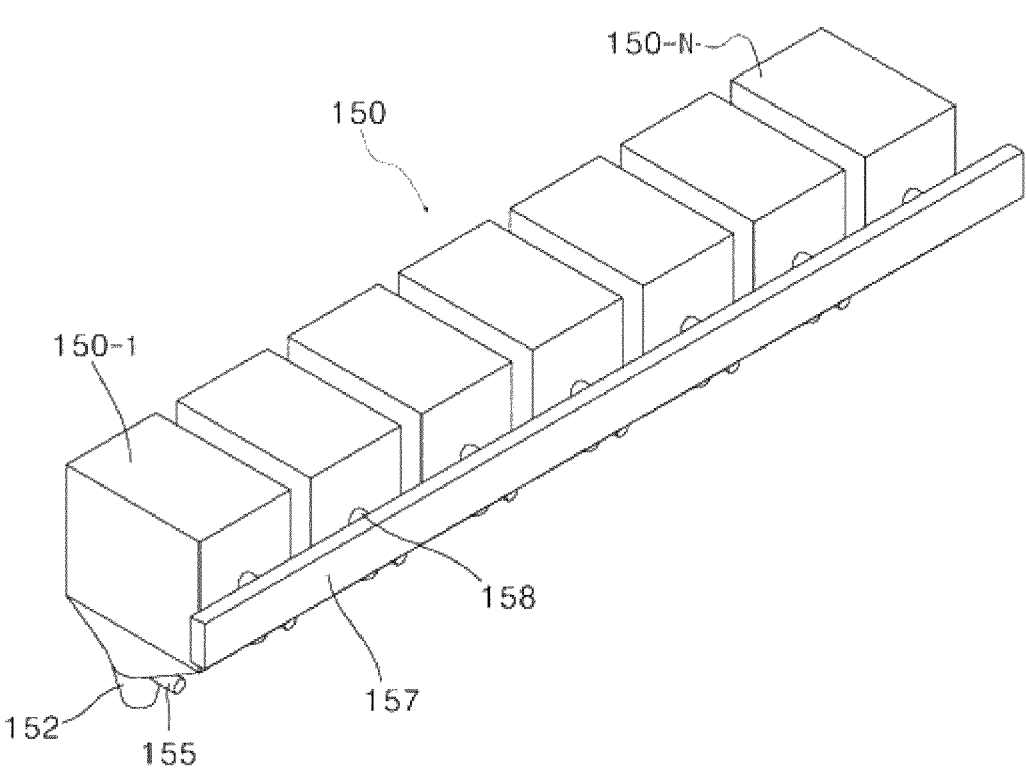

FIG. 17 is a view illustrating a rear surface portion of the integrated discharging portion 150. The respective food ingredient distributing portions 150-*n* are connected as one by the moving bar 157, and a side surface of the moving bar 157 is provided with the rectilinear moving portion 130 that is configured to allow the moving bar 157 to be rectilinearly moved. As all of the food ingredient distributing portions 150-*n* are connected as one by the moving bar 157, all of the food ingredient distributing portions 150-*n* are configured to be rectilinearly moved together by the rectilinear movement of the moving bar 157.

The valve driving portion 140-*n* is provided between the food ingredient distributing portion 150-*n* and the food ingredient discharging port 152, respectively, so that the food ingredient in the selected food ingredient distributing portion 150-*n* is added into the inner portion 10 by the respective valve driving portion 140-*n*. That is, the food ingredient is added by the valve driving portion 140-*n* that opens and closes the valve 156-*n* provided between the food ingredient distributing portion 150-*n* and the food ingredient discharging port 152.

Figure 18:
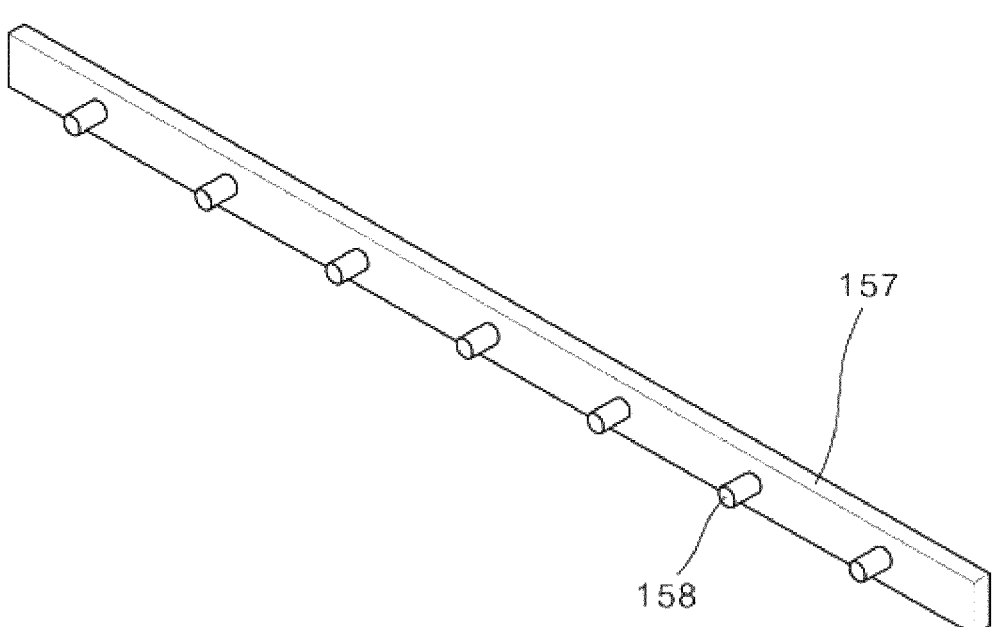

FIG. 18 is a view illustrating the moving bar 157. A connecting portion 158 is provided at the moving bar 157, and each of the food ingredient distributing portions 150-*n* is connected to the moving bar 157 by the connecting portion 158.

Figure 19:
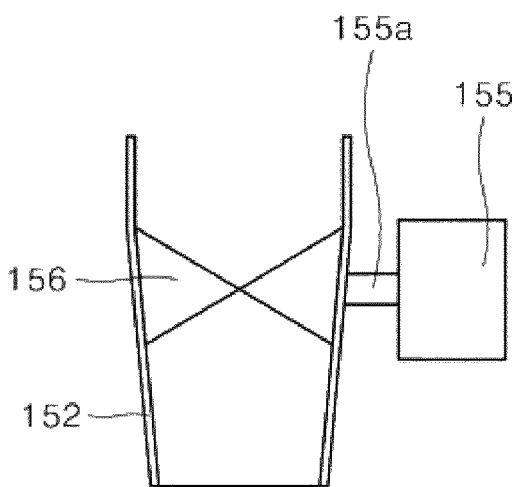
Figure 20:
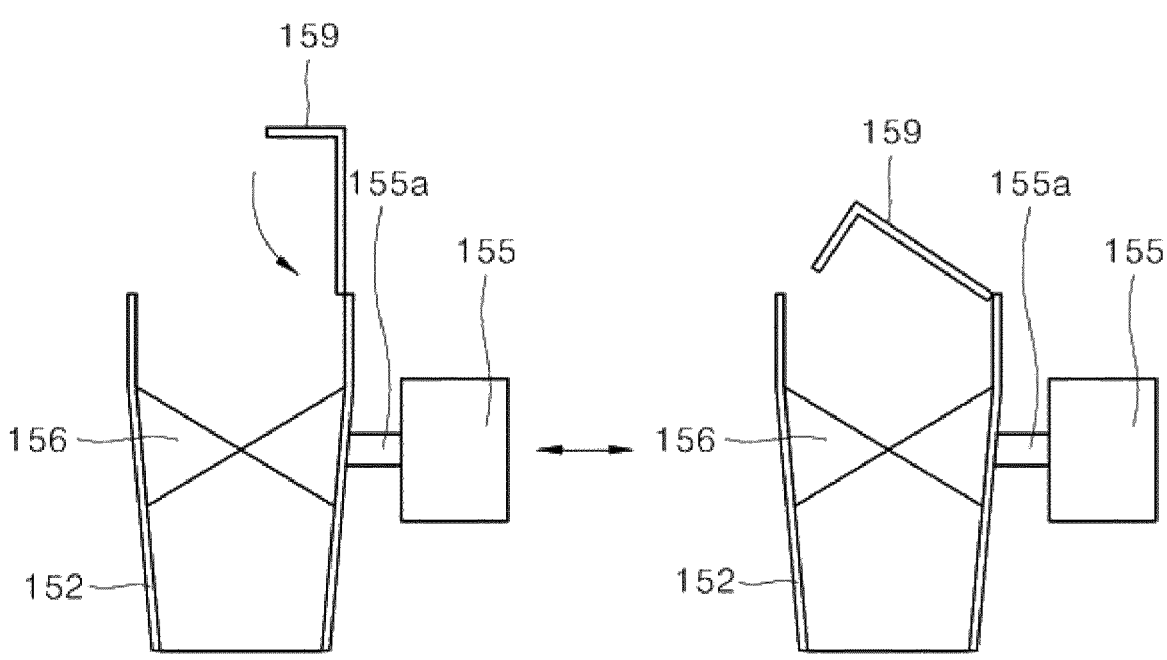

FIGS. 19 and 20 are views illustrating the valve 156 that is provided between the food ingredient distributing portion and the food ingredient discharging port. As illustrated in FIG. 19, the valve 156 is provided between the food ingredient distributing portion 150-*n* and the food ingredient discharging port 152. The valve 156 is driven by the valve driving portion 140-*n*, and there is a connecting shaft 155*a* configured to transmit a power therebetween.

The food ingredient accommodated in the food ingredient distributing portion 150-*n* descends by gravity as the valve 156 is opened. However, depending on the types of the food ingredients, the food ingredient may not naturally descend with only a force of gravity. In order to solve this problem, a rotary moving plate 159 as illustrated in FIG. 20 is further provided. As the rotary moving plate 159 is rotated in an arrow direction in FIG. 20, the food ingredient is capable of being forcibly moved in a downward direction.

Figure 21:
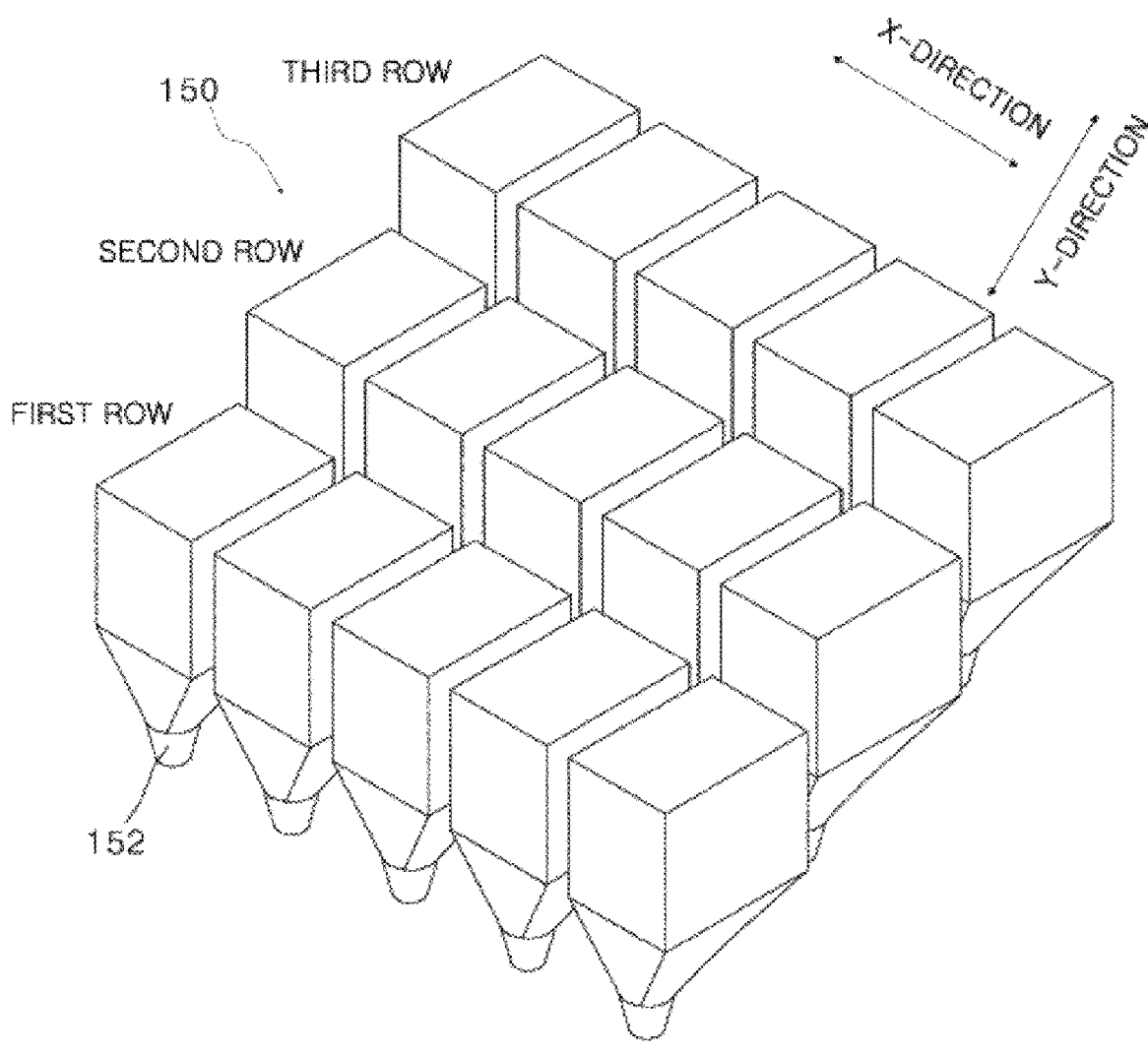
FIG. 21 is a view illustrating the food ingredient distributing portions arranged in a plurality of columns according to an embodiment of the present disclosure.

FIG. 21 is a view illustrating the integrated distributing portion 150 arranged in a plurality of columns according to an embodiment of the present disclosure.

There may be many types of food ingredients when stir-fry cooking is performed. Accordingly, there are the multiple food ingredient distributing portions 150-*n* provided, and in such a situation, a length of each of the food ingredient distributing portions 150-*n* becomes excessively long. In order to solve this problem, the food ingredient distributing portions 150-*n* may be provided to be arranged in the plurality of columns.

That is, the each of the food ingredient distributing portions 150-*n* is provided to be arranged in a first row from a first number to n-th number thereof, in a second row from a first number to n-th number thereof, and in a third row from a first number to an n-th number thereof. Of course, the number of the food ingredient distributing portions 150-*n* provided in respective rows may be the same to each other, or may be different from each other.

At this time, the food ingredient mixed with the condiment in advance is accommodated in the corresponding food ingredient distributing portion 150-*n*. Further, in the process of providing the food ingredient by controlling the central processing unit 250, all of the food ingredients at the respective food ingredient distributing portions 150-*n* required for cooking are controlled to be added by the central processing unit 250.

Therefore, as a method of adding the food ingredient, for example, the food ingredient may be added into the inner portion 10 of the housing portion 25 in an order in which the third food ingredient distributing portion 150-3 in the first row is added and the first food ingredient distributing portion 150-1 in the second row is added and then the fifth food ingredient distributing portion 150-5 in the third row is added. For realizing this method, by a predetermined algorithm and data of a moving distance, the central processing unit 250 controls a movement of the integrated distributing portion 150 formed in the plurality of columns in an X-direction and an Y-direction.

A movement of the integrated distributing portion 150 in the X-direction is performed by driving the rectilinear moving portion 130, and a movement of the integrated distributing portion 150 in the Y-direction is performed by adding a driving portion capable of being rectilinearly moved using the same principle.

As described above, the present disclosure is described with reference to the drawings. However, the present disclosure is not limited by the embodiments and drawings disclosed in the present specification. It will be apparent that various modifications may be made thereto by those skilled in the art within the scope of the present disclosure. Furthermore, although the effect resulting from the features of the present disclosure has not been explicitly described in the description of the embodiments of the present disclosure, it is obvious that a predictable effect resulting from the features of the present disclosure should be recognized.

The invention claimed is:

1. A cooking apparatus comprising:

a receiving portion (90) having a body portion (91) and a water collecting portion (92) that is provided with a funnel-shaped waterway extending in a downward direction;

a first driving portion (30) and a second driving portion (40), the first driving portion (30) comprising a first motor member (31) having a first output shaft (32);

a housing portion (25) having a cylindrical shape with an open top surface and a convex bottom surface and forming a compartment therein;

an inner portion (10) coupled to be inserted into the compartment of the housing portion (25), having a cylindrical shape with an open top surface for storing food therein;

an induction wire (80) installed in a space between a side of the inner portion (10) and a side of the housing portion (25);

the first motor member (31) mounted on the bottom surface of the housing portion (25) in a space between a bottom surface of the inner portion (10) and the bottom surface of the housing portion (25);

an injecting portion (93) installed in an area of the water collecting portion (92) of the receiving portion (90) and injecting water;

wherein the second driving portion (40) comprises:

an elevating body (48) fixedly mounted on the receiving portion (90);

a rod member (49) protruding from an upper side of the elevating body (48) and being movable in a vertical, upward direction;

an inner support portion (46), the bottom of which is fixedly installed on top of the rod member (49);

a second motor member (41) having a second output shaft (42) projecting in a direction perpendicular to the vertical, upward direction, the second motor member (41) rotating the housing portion (25) in a second direction (A2), the second motor member (41) being fixedly installed on top of the inner support portion (46), wherein the rod member (49), the inner support portion (46), and the second motor member (41) are arranged in the vertical, upward direction; and a coupler (43) inserted between the second output shaft (42) and a side portion of the housing portion (25) and coupling the second output shaft (42) and the side portion of the housing portion (25), wherein the first output shaft (32) is installed fixedly to the bottom surface of the inner portion (10) such that the rotation of the first output shaft (32) causes the inner portion (10) to rotate in a first direction (A1), wherein an outermost dimension of the funnel-shaped waterway is larger than an outermost dimension of the inner portion (10), wherein the inner portion (10) is configured to be cleaned by injecting water through the injecting portion (93) in a state in which the housing portion (20) is rotated 180° in the second direction (A2) by the second motor member (41) and is lowered by the rod member (49) until the upper portion of the inner portion (10) is positioned below the upper portion of the funnel-shaped waterway, wherein the cooking apparatus further comprises an integrated distributing portion (150) comprising a plurality of food ingredient distributing portions (150-*n*) in which food ingredients are respectively contained, and while one of the food ingredient distributing portions (150-*n*) is selected among the plurality of the food ingredient distributing portions (150-*n*) and the food ingredient contained in the selected food ingredient distributing portion (150-*n*) is supplied, the food ingredient distributing portion (150-*n*) is selected by rectilinearly moving the food ingredient distributing portion (150-*n*).

2. The cooking apparatus of claim 1, further comprising a central processing unit configured to control a driving of the cooking apparatus and to control a movement of the food ingredient distributing portions and to control an adding of the food ingredient, wherein, when cooking of the food begins, the central processing unit performs an algorithm of adding the food ingredient from the food ingredient distributing portion.

3. The cooking apparatus of claim 2, wherein the central processing unit performs the algorithm of adding the food ingredient during stir-fry cooking, or performs the algorithm of adding the food ingredient after finishing of the stir-fry cooking.

4. The cooking apparatus of claim 2, further comprising a memory portion in which an algorithm and data are stored, wherein the integrated distributing portion is provided with the plurality of the food ingredient distributing portions, a distance between each of the food ingredient distributing portions in the integrated distributing portion is predetermined, an order of the food ingredient distributing portions that is an order of adding the food ingredient is predetermined, the predetermined order and the distance of moving are stored in the memory portion as the data and the algorithm, and the central processing unit automatically adds the food ingredients by the data and the algorithm that are stored in the memory portion.

5. The cooking apparatus of claim 4, further comprising a food ingredient discharging port provided at a lower portion of each of the food ingredient distributing portions, wherein an inside of the food ingredient discharging port is further provided with a valve, and the food ingredient is added by opening and closing the valve.

6. The cooking apparatus of claim 4, wherein the plurality of the food ingredient distributing portions is provided to be arranged in a plurality of columns, and is provided with a food ingredient discharging port, respectively.

7. The cooking apparatus of claim 4, wherein each size of all of the food ingredient distributing portions existing in the integrated distributing portion is identical to each other.

8. The cooking apparatus of claim 1, wherein adding of the food ingredient after finishing the cooking exists, and a cleaning process of the inner portion provided in the housing portion is performed when the adding of the food ingredient is finished.

9. The cooking apparatus of claim 1, further comprising a moving bar, wherein each of the food ingredient distributing portions provided in the integrated distributing portion is connected as one by the moving bar, and the food ingredient distributing portions are rectilinearly moved by driving a rectilinear moving portion provided at an end of the moving bar.

10. The cooking apparatus of claim 5, wherein the central processing unit controls a rectilinear movement so that the food ingredient distributing portions that are selected are to be positioned at an upper end of the housing portion by the predetermined order, controls a valve driving controller of the respective food ingredient distributing portions positioned at the upper end of the housing portion.

11. The cooking apparatus of claim 1, further comprising:

a lower part of a driving case (50) encasing the elevating body (48); and an upper part of the driving case (50), a portion of the upper part of the driving case (50) being formed to cover an outer circumferential surface of the lower part of the driving case (50), and a remaining portion of the upper part of the driving case (50) encasing the inner support portion (46), the second motor member (41) and the coupler (43), wherein the upper part of driving case (50) has a through-hole formed in the remaining portion, a portion of the coupler (43) is protruded outwardly through the through-hole, and the side portion of the housing portion (25) is coupled to the portion of the coupler (43) so that the housing portion (25) is rotated in the second direction (A2) according to the rotation of the second output shaft (42), wherein the upper part of the driving case (50) is moved up and down while being guided along the outer circumferential surface of the lower part of the driving case (50).

\* \* \* \* \*